(12) United States Patent
Aull et al.

(10) Patent No.: US 6,640,427 B2
(45) Date of Patent: Nov. 4, 2003

(54) APPARATUS FOR MAKING CONTACT BODIES

(75) Inventors: Richard J. Aull, Reading, PA (US); Al Bino, Sinking Spring, PA (US); Timothy E. Krell, Fleetwood, PA (US); Palle Rye, Shillington, PA (US); Andrew L. Truex, Shillington, PA (US)

(73) Assignee: Brentwood Industries, Inc., Reading, PA (US)

( * ) Notice: Subject to any disclaimer, the term of this patent is extended or adjusted under 35 U.S.C. 154(b) by 0 days.

(21) Appl. No.: 10/279,172

(22) Filed: Oct. 24, 2002

(65) Prior Publication Data

US 2003/0033708 A1 Feb. 20, 2003

Related U.S. Application Data

(62) Division of application No. 09/660,955, filed on Sep. 13, 2000, now Pat. No. 6,544,628.
(60) Provisional application No. 60/154,085, filed on Sep. 15, 1999.

(51) Int. Cl.[7] .............................................. B23P 19/00
(52) U.S. Cl. .......................................... 29/796; 29/521
(58) Field of Search .................... 29/6.1, 6.2, 896.6, 29/896.62, 890.08, 796, 243.53, 514, 521, 524.1; 425/517, 520

(56) References Cited

U.S. PATENT DOCUMENTS

| | | | |
|---|---|---|---|
| 2,746,139 A | * 5/1956 | Van Pappelendam | ........ 29/521 |
| 3,262,682 A | 7/1966 | Bredberg | |
| 3,281,307 A | 10/1966 | Moeller et al. | |
| 3,415,502 A | 12/1968 | Munters | |
| 3,474,585 A | * 10/1969 | Foster | ............. 52/394 |
| 3,475,012 A | 10/1969 | Britton et al. | |
| 3,615,274 A | 10/1971 | Belada | |
| 3,798,299 A | 3/1974 | Gumm et al. | |
| 3,963,810 A | 6/1976 | Holmberg et al. | |
| 4,344,899 A | 8/1982 | Monjoie | |
| 4,395,448 A | 7/1983 | Lefevre et al. | |
| 4,581,183 A | 4/1986 | Lefevre | |
| 4,657,711 A | 4/1987 | Wigley | |
| 4,668,443 A | 5/1987 | Rye | |
| 4,670,197 A | 6/1987 | Stackhouse | |
| 4,760,634 A | * 8/1988 | Rapp | ............ 29/509 |
| 4,800,047 A | 1/1989 | Monjoie | |
| 4,835,850 A | * 6/1989 | Eckold et al. | ......... 29/243.529 |
| 5,204,027 A | 4/1993 | Armstrong et al. | |
| 5,413,872 A | 5/1995 | Faigle | |
| 5,474,832 A | 12/1995 | Massey | |
| 5,577,313 A | * 11/1996 | Guido et al. | ............. 29/432.2 |
| 5,747,140 A | 5/1998 | Heerklotz | |
| 6,139,974 A | * 10/2000 | Atkinson et al. | ........... 428/595 |
| 6,231,944 B1 | * 5/2001 | Holt | ............ 428/57 |

FOREIGN PATENT DOCUMENTS

| | | |
|---|---|---|
| DE | 29 47 499 B | 6/1981 |
| DE | 44 18 651 C | 4/1995 |
| EP | 0 138 401 | 4/1985 |
| JP | 59 120 416 A | 7/1984 |

* cited by examiner

*Primary Examiner*—David P. Bryant
(74) *Attorney, Agent, or Firm*—Akin, Gump, Strauss, Hauer & Feld, L.L.P.

(57) ABSTRACT

An apparatus for connecting contact sheets to form a contact body is disclosed, that provides for deforming projection-depression couplings formed in two or more interlocking sheets to form positive locks by which assemblies of sheets are formed. The apparatus includes crimping devices that crimp projection-depression couplings located in the interior area of the interlocked sheets and projection-depression couplings located adjacent the side edges of the interlocked sheets, again to form positive locks by which assemblies of sheets are formed.

14 Claims, 18 Drawing Sheets

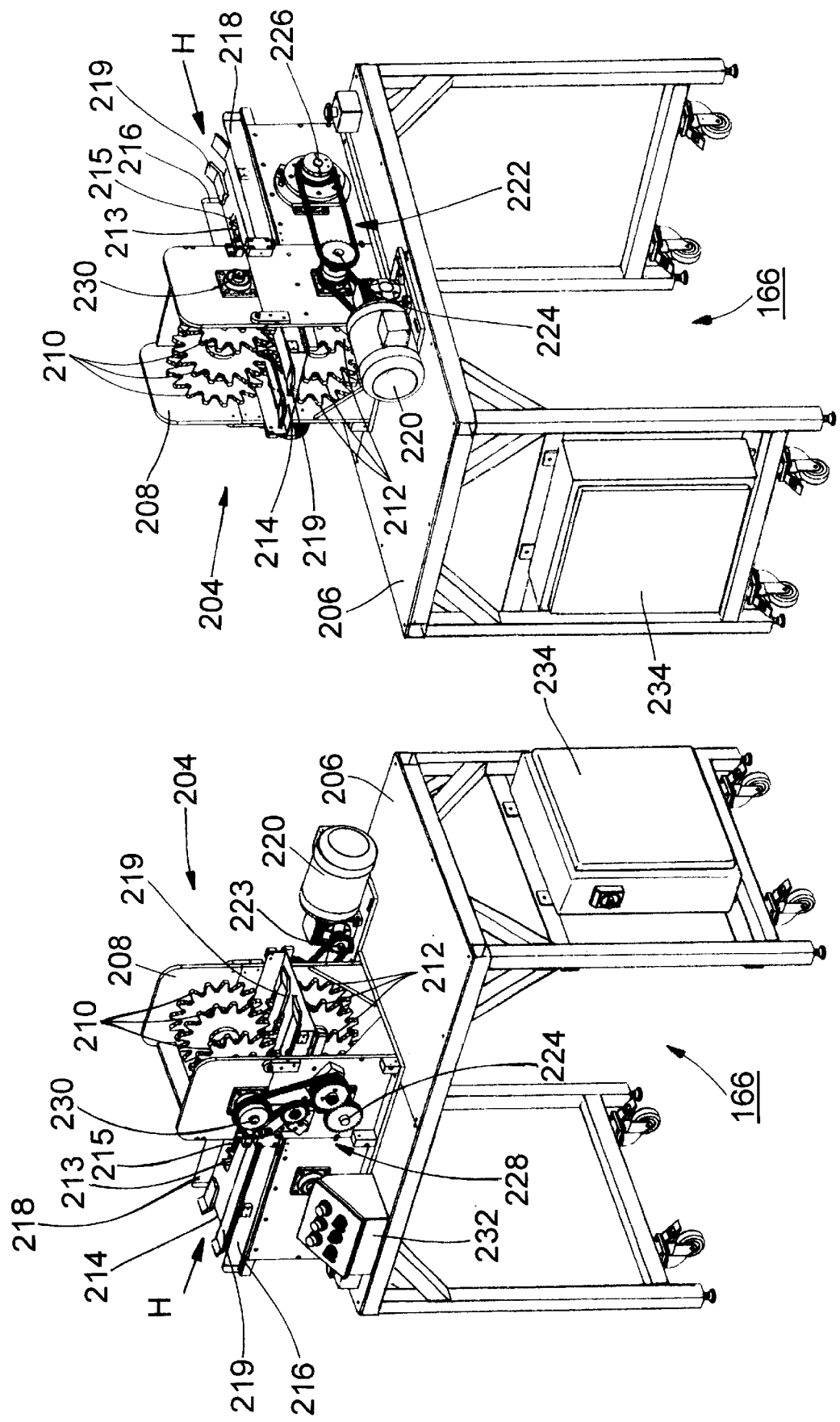

APPARATUS FOR MAKING CONTACT BODIES

CROSS-REFERENCE TO RELATED APPLICATIONS

This application is a division of prior U.S. patent application Ser. No. 09/660,955, filed Sep. 13, 2000, entitled CONTACT BODIES AND METHOD AND APPARATUS OF MAKING SAME, now U.S. Pat. No. 6,544,628, the entire disclosure of which is incorporated herein by reference, which claimed priority from U.S. Provisional Patent Application No. 60/154,085, filed Sep. 15, 1999.

BACKGROUND OF THE INVENTION

The present invention relates to contact bodies, such as gas/liquid contact bodies, comprised of two or more individual contact sheets, and to a method and apparatus for connecting two or more contact sheets. More particularly, the present invention relates to a method and apparatus for connecting two or more contact sheets with at least one positive lock between the contact sheets, and to the contact bodies so made.

Various types of apparatus and products are known in the art for providing gas/liquid contact for several different purposes. Among such purposes, for example, are heat transfer, such as evaporative heat exchangers, the removal of pollutants from a gas (gas scrubbing), use in trickle filters (a type of biological filter), artificial reefs, and other industrial or other types of uses. Gas/liquid contact bodies are generally designed to promote the intimate mixture of and heat exchange between two fluid streams. The fluid streams can be concurrent-flowing, cross-flowing, or counter-flowing streams. The intimate mixture of two fluid streams, air and water for example, or other gases and liquids, is accomplished by providing a series of corrugated contact sheets in contact with each other such that the crests and valleys of the corrugations form channels or passageways. The contact body can be positioned so that the channels are oriented in a vertical manner and the water is allowed to trickle down the walls of each channel while a gas, typically air, flows through the contact body simultaneously, thereby cooling the water. As mentioned above, the air can flow concurrently with the water, cross-currently (i.e., horizontally in the case of vertically disposed channels), or counter-currently. Air flow may be improved by the use of a blower or a fan.

Many variations to the design of contact sheets used to form the contact bodies have been described. For example, U.S. Pat. Nos. 4,668,443 and 5,217,788, the entire contents of which are herein incorporated by reference, describe various shapes and forms of contact sheets. Efforts have been directed to enhancing the wettability of the sheets, or increasing the surface area of the contact body, or reducing the impedance to air flow, while enhancing or at least maintaining the gas and liquid contact efficiency. Variations have been made in an effort to reduce the cost of such contact bodies, or to make construction easier.

At any rate, all contact bodies comprise a plurality of contact sheets in contact with, and preferably fastened to, one another in some manner. Most often an adhesive is used to fix one sheet to another at the intersecting points of contact. Heat-welding is another common technique used in connecting the sheets. However, a problem with conventional methods of connecting contact sheets is the lack of durability. Adhesives and spot welds can wear and deteriorate to a point where the strength of the connection is such that relatively slight forces can separate the sheets. Such a separation can be a serious problem to the structural integrity of a contact body. Other problems associated with adhesives and welding methods of connection are high cost, low speed and low productivity. The application of an adhesive at all points of contact between two adjacent contact sheets, and/or the fusing together of two sheets, is time consuming and uses a large amount of adhesive and/or energy.

Potential solutions to these problems have been proposed but have not adequately dealt with the problems. For example, U.S. Pat. No. 3,281,307, the entire contents of which are herein incorporated by reference, discloses the use of "cup-like" depressions and corresponding projections for the purpose of situating adjacent contact sheets. However, U.S. Pat. No. 3,281,307 does not disclose or suggest that any positive lock is provided by such projections and depressions. Further connecting means, such as heat sealing, adhesives, screws, bolts and preferably welding, are still required to join the adjacent sheets together. U.S. Pat. No. 5,413,872, the entire contents of which are herein incorporated by reference, describes the use of pressure fasteners. However, such a mechanism of connecting contact sheets may still be susceptible to inadvertent separation since the amount of force required to separate is equal to, or at least not significantly greater than, the force needed to join the pressure fasteners.

Thus, there exists a need in the art for a method of connecting contact sheets in which the resulting connection is strong, durable, economical and substantially inseparable. The present invention satisfies this need.

BRIEF SUMMARY OF THE INVENTION

The present invention relates to an apparatus for crimping together interlocked portions of at least two sheets of deformable sheet material, the corrugations having crests and valleys, the crests having peaks and the valleys having troughs, the sheet material being defined by opposed side edges and having opposing surfaces, the sheet material having a plurality of projections extending outward from one surface of each sheet and located on the peak surfaces of the crests and the trough surfaces of the valleys, wherein each projection defines a depression on the opposite surface of the sheet, the projections of one sheet being disposed within mating depressions of an adjacent sheet to form projection-depression couplings, and the projection-depression couplings being deformable to form positive locks by being crimped into a form of flattened interlocking rivets, the apparatus comprising a support surface for the sheets, a first crimping surface disposed adjacent one surface of the sheets and a second crimping surface disposed adjacent the opposite surface of the sheets and alignable with the first crimping surface, the first and second crimping surfaces having an open position for insertion of at least some of the projection-depression couplings formed by aligning the sheets such that the projection of one sheet is coupled with the depression of another sheet, the first and second crimping surfaces having a crimping position that deforms the projection-depression couplings to form a positive lock, each of the first crimping surfaces being formed on a portion of a tool having at least one of rotatable gear teeth and a jaw member relatively movable with respect to the second crimping surfaces, the second crimping surfaces being formed respectively on at least one of rotatable gear teeth and an anvil member, the apparatus further comprising at least two tools for crimping at least two projection-depression couplings as the sheets travel past the tools, at least some of the tools are at least two laterally disposed gears having a plurality of teeth bearing the first crimping surfaces and disposed adjacent one surface of the sheets for crimping projection-depression couplings located on the interior of the sheets away from the side edges of the sheets and at least two laterally disposed gears having a plurality of teeth bearing the second crimping surfaces and disposed adjacent the opposite surface of the sheets aligned with the gear teeth bearing the first crimping surfaces for crimping projection-depression couplings located adjacent the side edges of the sheets, the apparatus further comprising another set of tools for crimping only the edge projection-depression couplings, wherein the another set of tools comprises one of (a) opposed pairs of gears aligned on opposite side edges of the sheets having teeth with beveled first and second crimping surfaces that are disposed to crimp projection-depression couplings adjacent each of the side edges of the sheets and (b) opposed pairs of jaw members and anvil members on which are formed first and second crimping surfaces, the opposed pairs being aligned adjacent the side edges of the sheets.

As used herein, the term "positive lock" refers to a connection between two contact sheets which is formed by the deformation of a projection-depression coupling, wherein the connection cannot be separated without the application of a force sufficient to destroy the coupling or adversely deform one or both of the contact sheets.

The apparatus of the present invention provides strong and durable connections between contact sheets which form a contact body. Furthermore, a contact body constructed in accordance with the present invention can be assembled quickly, easily, and without additional adhesives or welding equipment.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings:

FIG. 18 is a left-side isometric view of another, motorized crimping device in accordance with a particular preferred embodiment of the present invention, having portions of its housing removed for ease of illustration, suitable for use in the apparatus of FIG. 16.

FIG. 19 is a right-side isometric view of the crimping device illustrated in FIG. 18.

DETAILED DESCRIPTION OF THE INVENTION

Figure 1:
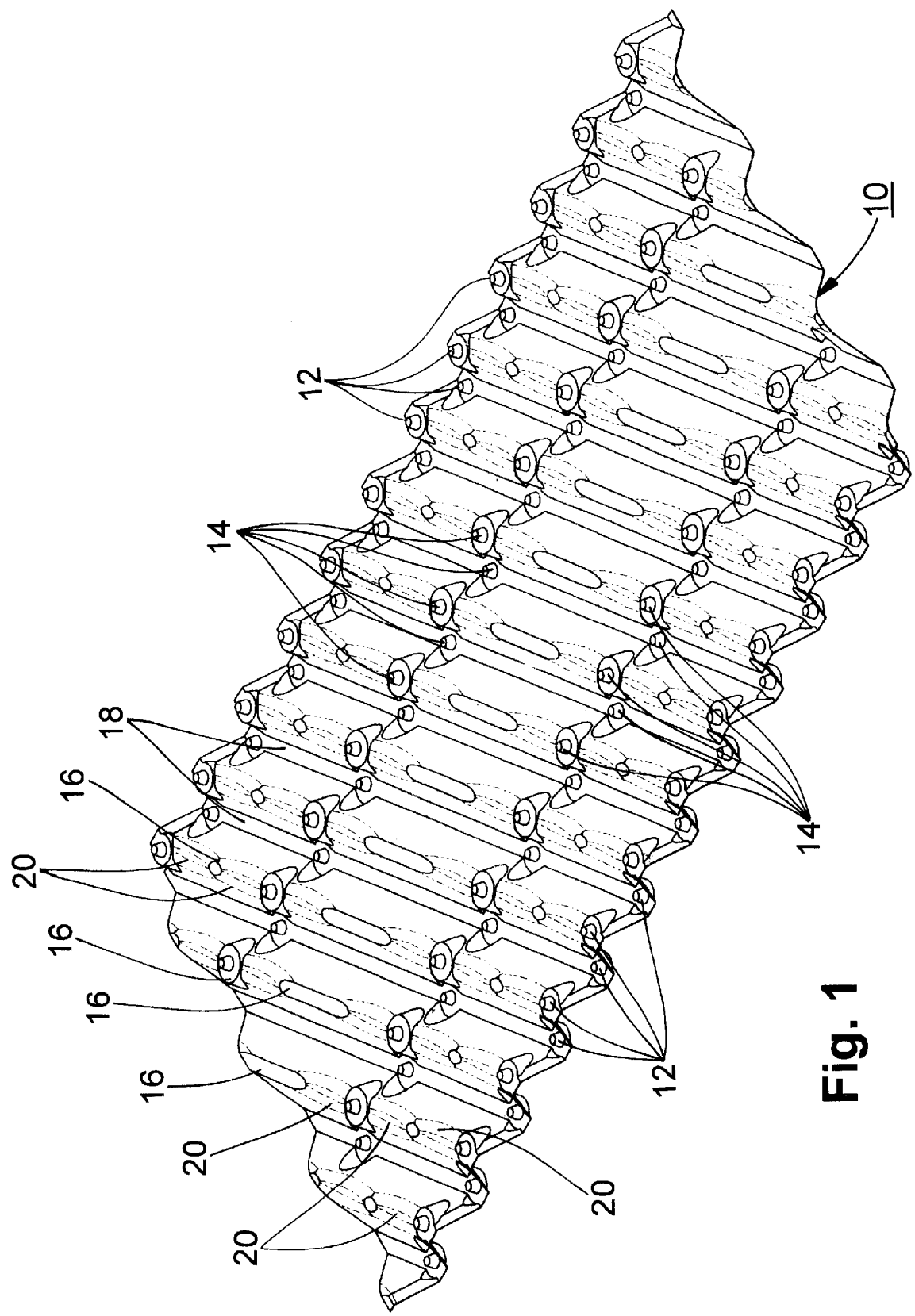
FIG. 1 is a top isometric view of a first contact sheet in accordance with a particular embodiment of the present invention.

Certain terminology is used in the following description for convenience only and is not limiting. The words "lower,"

"upper," "bottom," "top," "front," "back," "left," and "right" designate directions in the drawings to which reference is made, but are not limiting with respect to the orientation in which the contact body or contact sheets or apparatus used in making the contact body are oriented in use or in the manufacturing process. The terminology includes the words specifically mentioned above, derivatives thereof and words of similar import.

Furthermore, as used herein, the article "a" or a singular component includes the plural or more than one component, unless specifically and explicitly restricted to the singular or a single component.

Contact sheets that can be used in accordance with the present invention can be of any type, so long as at least two of the contact sheets have a projection extending out from one surface of the sheet, each projection defining a corresponding depression on the opposite surface of the sheet.

The sheets may have a corrugated form wherein each sheet has crests and valleys. The corrugations can be shaped, for example, such that the crests and valleys are flattened, rounded, or concave (including recesses, indentations or scalloped areas along portions of or along the entire length of the crests and valleys). The corrugations can be in the form of a sinusoidal wave. The number of corrugations and specific cross-sectional shape and dimensions of each corrugation can vary widely and are not critical to the present invention. Preferably, the crests and valleys of each contact sheet have at least one portion or surface area at the peak of the crest or trough of the valley, which is substantially parallel to the plane of the contact sheet. A preferred type of contact sheet is that disclosed in U.S. Pat. No. 5,217,788, the disclosure of which is hereby incorporated herein by reference, and which is assigned to the assignee of the present invention.

Contact sheets for use in the present invention can be made from a variety of mechanically deformable materials. The material must be capable of being mechanically deformable, such that upon a crimping, crushing or other type of mechanical deformation, the deformed material retains its deformed shape. Thus, materials such as natural or synthetic rubber that are elastomeric and resist deformation would not be suitable materials.

Sheet metals, thermoplastics, and composite materials composed of fibers impregnated with thermoplastic materials can all be used to form the contact sheets for use in the present invention. Sheet metals such as galvanized steel, stainless steel, aluminum and copper can be formed into contact sheets for use in the present invention. Thermoplastic materials which can be used in the present invention are, for example, polyvinyl chlorides (plasticized or unplasticized), polystyrenes, acetals, nylons, acrylonitrile-butadiene-styrene (ABS), styrene-acrylonitrile (SAN), polyphenylene oxides, polycarbonates, polyether sulfones, polyaryl sulfones, polyethylene, polystyrene, terephthalates, polyetherketones, polypropylenes, polysilicones, polyphenylene sulfides, polyionomers, polyepoxides, polyvinylidene halides, and derivatives and/or mixtures thereof. The particular material used is dependent upon the desired end use and the application conditions associated with that use, as is well known in the art. For example, in relatively low temperature cooling tower applications, a polyvinylchloride resin having little or no plasticizer is preferred. Presently it is preferred that a synthetic polymer, such as polyvinylchloride, polypropylene, ABS, or polystyrene, be used to form the contact sheets.

Contact sheets useful in accordance with the present invention can be manufactured by any conventional technique applicable to the material from which the contact sheet is to be made. For example, the sheets may be formed by conventional prior art processes, such as thermoforming, pressure forming, vacuum forming, molding, hot stamping, extrusion, injection molding, or the like. Thermoforming is preferred.

Each contact sheet for use in the present invention must have at least one projection, and preferably a plurality of projections, extending outward from one surface of the contact sheet. It is generally preferred that the projections extend out perpendicularly from the plane of the contact sheet, although projections extending at an angle other than 90□ from the contact sheet plane can be used in the present invention. The projection, or projections, can be located anywhere on the sheet. Preferably, each contact sheet is corrugated and there is a plurality of the projections located on a crest or valley of the sheet. Most preferably, the projections are located on portions of the crests and valleys that are substantially parallel to the plane of the contact sheet, as best shown in FIGS. 1–4.

The exact shape and size of projections in accordance with the present invention are unimportant. The projections are preferably in the shape of a truncated cone, however, the projections may be of any shape whatsoever, including but not limited to, rounded cones, pyramids with three or four triangular or truncated triangular side walls, or projections with a cross-sectional shape of octagons, squares, etc. It is not essential, but preferred, that the shape of the projections and any corresponding depressions be complementary, but the projection must be capable of fitting within the corresponding depression. Thus, for example, a properly sized truncated pyramidal projection could fit within a truncated conical depression, or vice versa. By having the shapes of the projections and depressions complementary, however, better nesting of the contact sheets can be achieved before they are assembled. This helps reduce the space and the cost of packaging, shipping and storage. Truncated cones or rounded cones are preferred due to the strength of the joint created. Furthermore, truncated cones provide a particularly preferred configuration with respect to packaging (nesting multiple contact sheets together prior to assembling the sheets into contact bodies), formability and strength.

In a particularly preferred embodiment in accordance with the present invention and as best shown in FIGS. 1–4, the contact sheets are corrugated such that the crests and valleys have flat portions substantially parallel to the plane of the contact sheet. Also, as best shown in FIGS. 1–4, there are a number of projections, preferably evenly spaced along each crest and valley, extending outward from one surface of the contact sheet in a direction perpendicular to the surface of the contact sheet. The illustrated projections are in the shape of a truncated cone.

The invention will now be described in detail with reference to the drawings, wherein like numerals indicate like elements throughout the several views.

FIG. 1 illustrates one preferred embodiment of a contact sheet 10. Contact sheet 10 has a plurality of projections 12 and 14 extending outward from the surface shown as the upper surface of the contact sheet. The projections could extend downward, if desired. The projections, which define corresponding depressions on the opposite surface of the contact sheet 10, are located on the crests 16 and valleys 18 of the sheet. The crests and valleys form a corrugated contact sheet. Preferably, the projections are located on the peak surfaces of the crests and the trough surfaces of the valleys that are substantially parallel to the plane of the contact sheet. Also preferably, the projections located on the peak surfaces are aligned longitudinally with the projections located on the trough surfaces. Some of the projections are designated as edge projections 12, due to their location adjacent the side edges of each sheet. The remaining projections are designated interior projections 14, due to their location in the interior of the sheet away from the side edges. Preferably, for strength and structural integrity, there are a number of projections on each of the peaks of the crests 16 and on each of the troughs of the valleys 18. Likewise, for purposes of structural integrity and otherwise as explained in above referenced U.S. Pat. No. 5,217,788, the crests and valleys may include indented or recessed portions 20, if desired.

Figure 2:
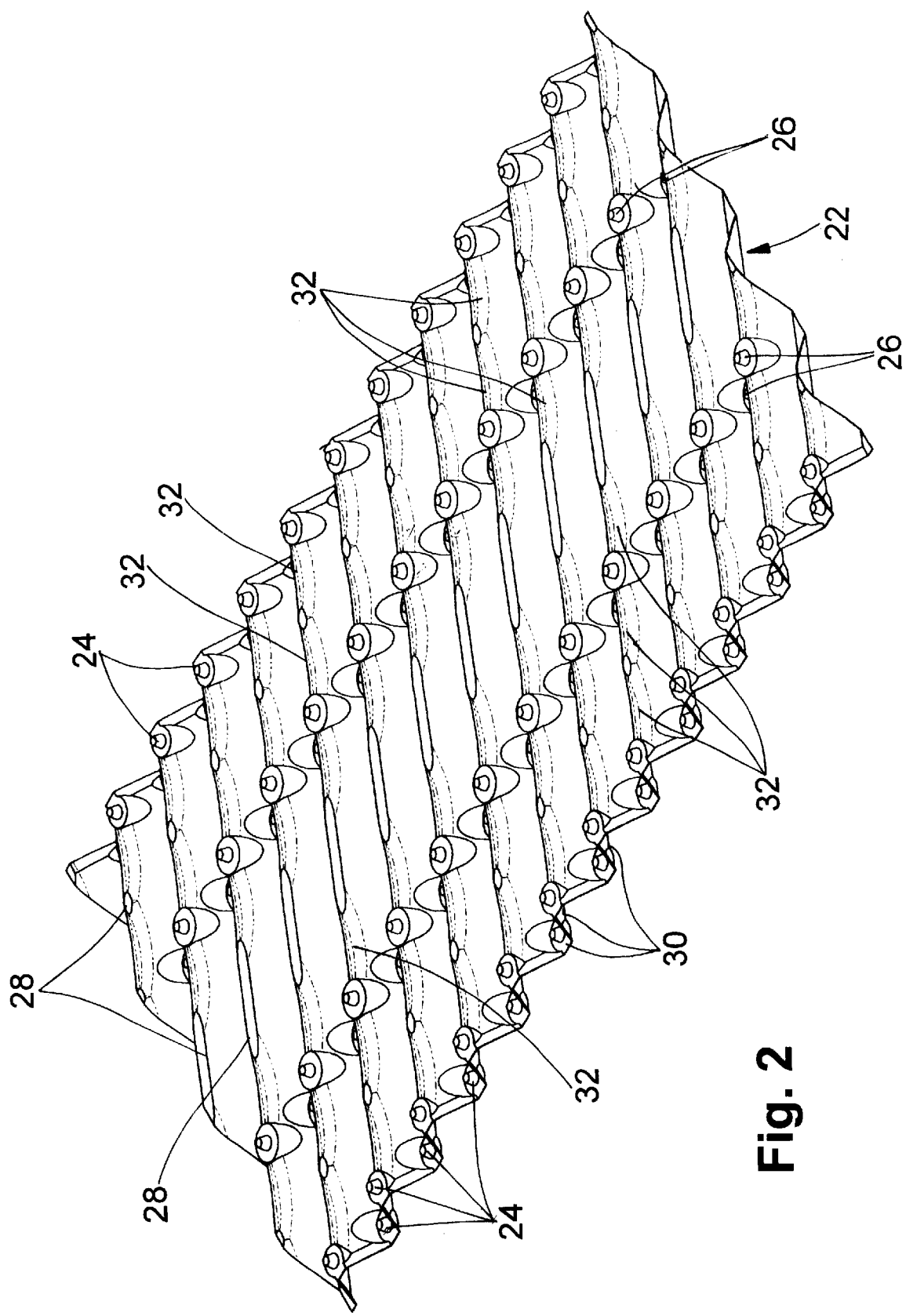
FIG. 2 is a top isometric view of another contact sheet in accordance with a particular embodiment of the present invention having corrugations running generally transverse to the direction of corrugations of the contact sheet of FIG. 1.

FIG. 2 illustrates another contact sheet 22 that is similar in structure to the contact sheet 10 illustrated in FIG. 1, except that the contact sheet 22 has corrugations formed by the crests 28 and valleys 30 that cross the corrugations formed by the crests 16 and valleys 18 of the contact sheet 10 when the sheets 10 and 22 are joined together. As described above with respect to contact sheet 10, contact sheet 22 may, for purposes of structural integrity and otherwise as explained in above-referenced U.S. Pat. No. 5,217,788, the crests and valleys may include indented or recessed portions 32, if desired. The corrugations of either sheet 10 or 22 are formed at any desired angle with respect to the side edges of the contact sheets, depending on the particular equipment, environment and purpose for which the contact bodies made from the contact sheets are used. The corrugations of either contact sheet 10 or 22 can be of any desired shape or dimensions. Further, the corrugations of either contact sheet need not have the same shape and dimensions or even be present throughout the entire area or surface of the contact sheets. The contact sheets 10 may nest one on top of the other, with the corrugations going in the same direction, for better economy of packaging, shipment and storage. Likewise, the contact sheets 22 may nest one on top of the other, with the corrugations going in the same direction, for better economy of packaging, shipment and storage.

The contact sheet 22 includes a plurality of edge projections 24 and a plurality of interior projections 26. The edge projections on the peaks of the crests 28 and the troughs of the valleys 30 are in substantial longitudinal alignment, and the interior projections 26 on the peaks and troughs are also in substantial longitudinal alignment, as illustrated in FIG. 2 and explained above with respect to the contact sheet 10 illustrated in FIG. 1.

Figure 3:
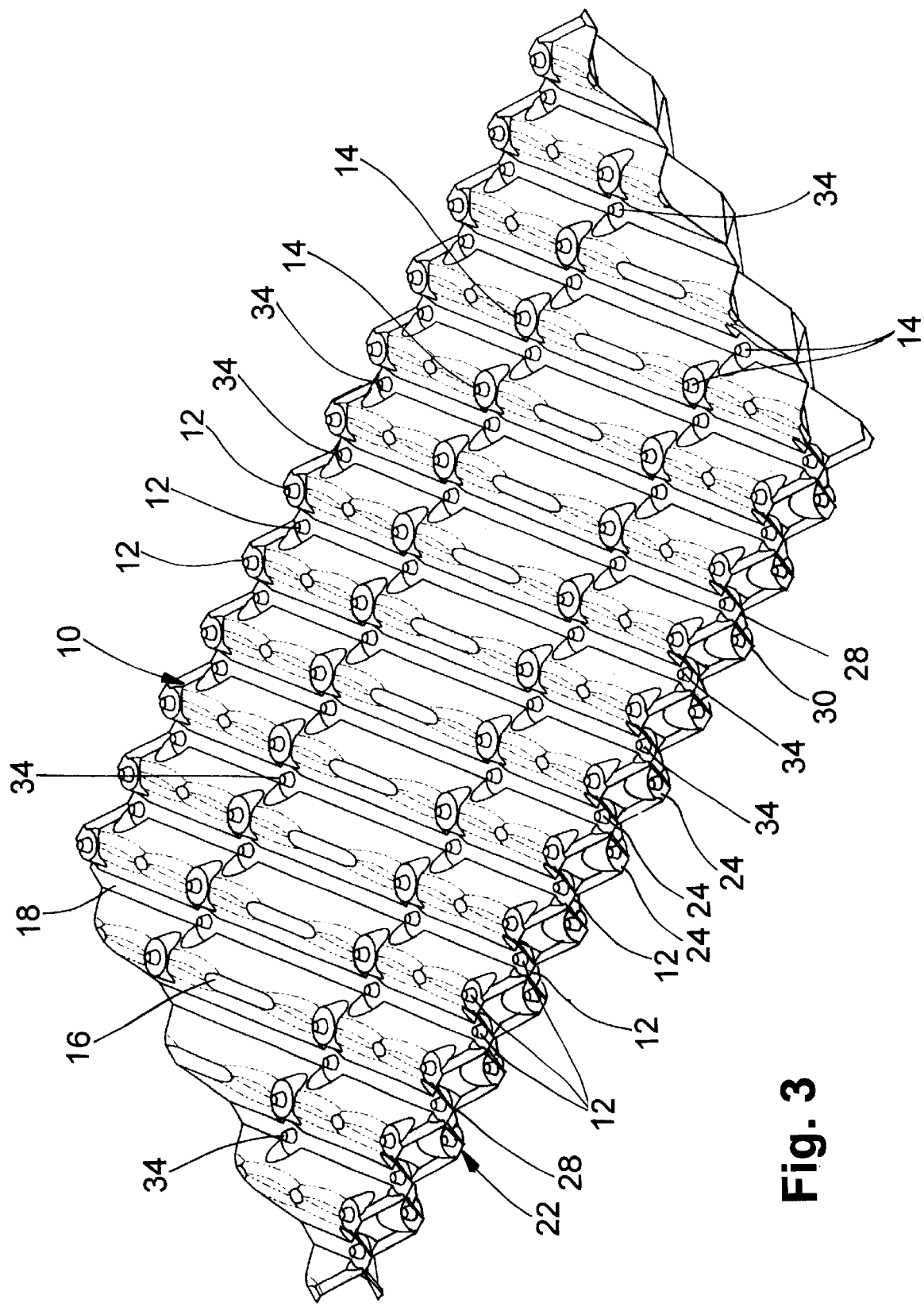
FIG. 3 is a top isometric view of two contact sheets where the contact sheet of FIG. 1 is overlapping the contact sheet of FIG. 2 prior to formation as a contact body by formation of a positive lock by deforming the projection-depression couplings formed when the projections located on the crests of the bottom sheet are located within the depressions in the valleys of the top sheet.

FIG. 3 illustrates a contact sheet 10 positioned adjacent to (on top of) another contact sheet 22, in preparation to form a contact body of at least two contact sheets. The two contact sheets 10 and 22 are positioned such that those of the projections 24, 26 (best seen in FIG. 10) which are located on the crests 28 of the contact sheet 22 are located within the depressions defined by the opposite surfaces of those of the projections 12 and 14 which are located on the valleys 18 of the contact sheet 10. Once contact sheets 10 and 22 are positioned in such a manner, the projections on the crests of the contact sheet 22 located within the depressions defined by projections on the valleys of the contact sheet 10 form a plurality of projection-depression couplings 34. Additionally, when positioned as shown in FIG. 3, the two contact sheets 10 and 22 define a plurality of channels between the sheets defined by the spaced crests 16 of the contact sheet 10 and the valleys 30 of the contact sheet 22.

Figure 4:
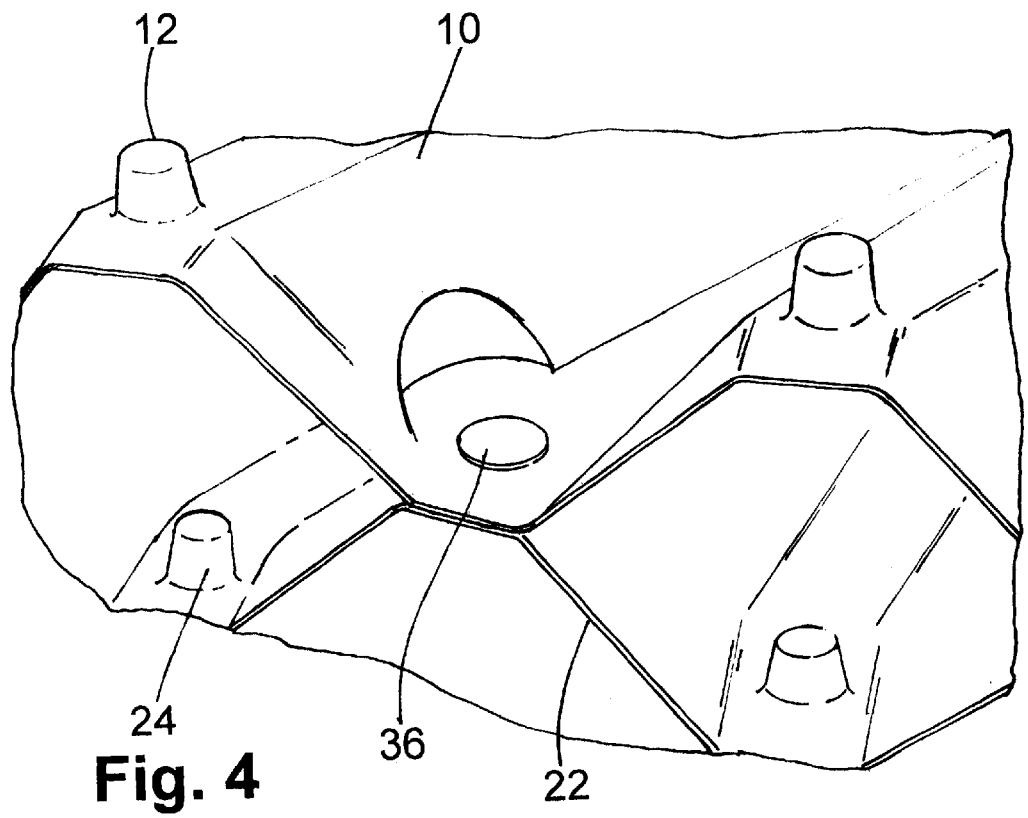
FIG. 4 is an enlarged view of a portion of a side edge of the contact sheets of FIG. 3 after formation of the sheets into a contact body, illustrating a positive lock created by the deformation of a projection-depression coupling.
Figure 10:
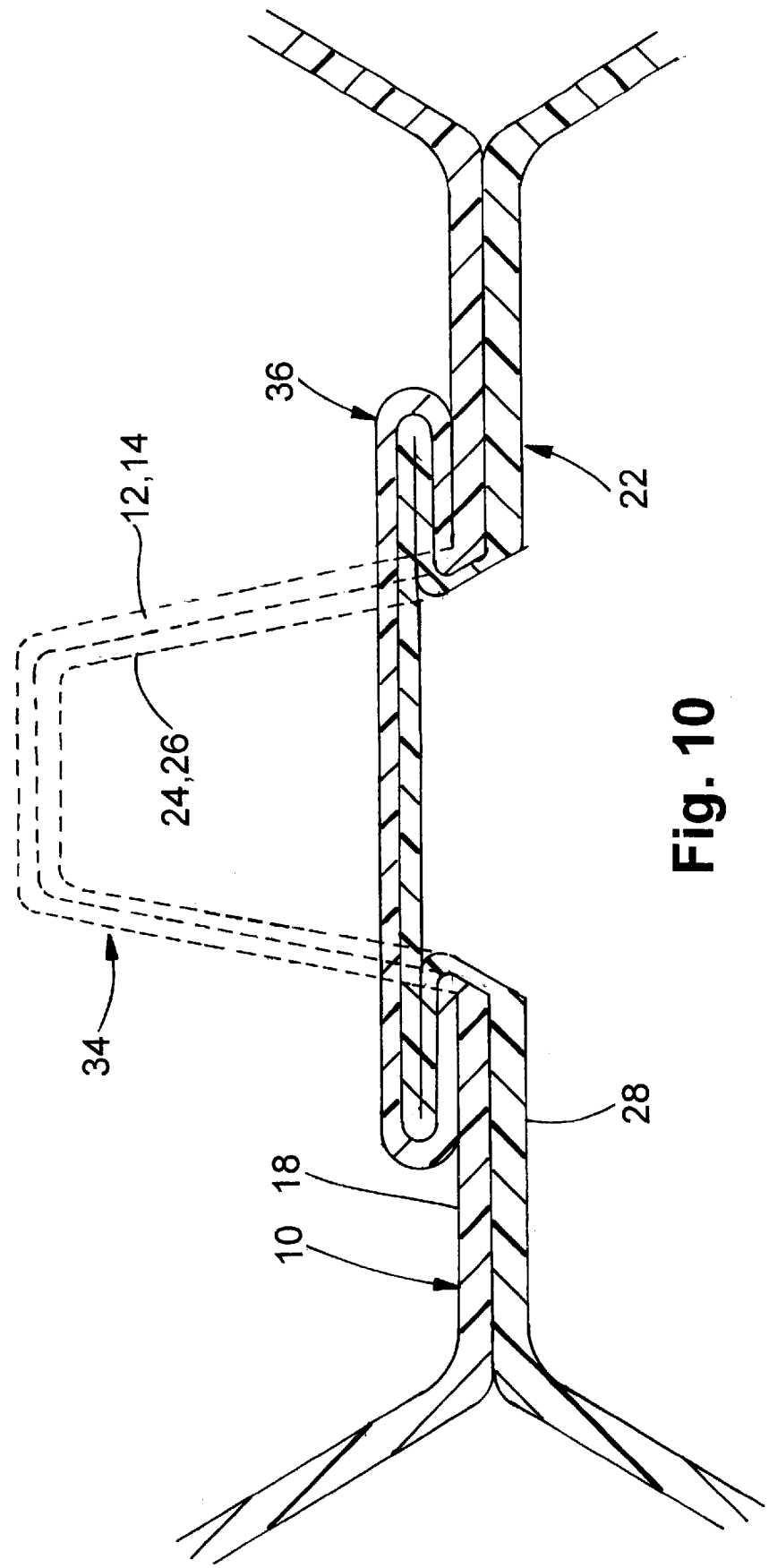
FIG. 10 is a cross-sectional view of a positive lock formed by deforming a projection-depression coupling of two contact sheets in accordance with a particular embodiment of the present invention.

FIGS. 4 and 10 show an enlarged view of a portion of a side edge and a cross-sectional view, respectively, of particular embodiments of the present invention wherein one of the projection-depression couplings has been deformed, namely, flattened, between a pair of platens, or similar crimping device, to form a positive lock 36. It should be understood that no particular or specific device need be used in creating a positive lock between the projection and the depression of a projection-depression coupling. Particularly preferred devices and/or mechanisms for creating a positive lock between the projection and the depression of a projection-depression coupling are described below.

FIGS. 4 and 10 show the projection-depression coupling 34 shown in FIG. 3 after the positive lock 36 has been formed. In the embodiment of the present invention best shown in FIGS. 4 and 10, the positive lock 36 is comprised of a flattened or crushed projection-depression coupling 34. It should be understood that a positive lock in accordance with the present invention can be formed in several ways, such as, for example, as above by the deformation of the projection-depression coupling in a direction perpendicular to the plane of the contact sheets, by squeezing the projection-depression coupling together in a direction parallel to the plane of the contact sheets, by bending the projection-depression coupling to one side or the other, by twisting the projection-depression coupling, or by any other force which locks the projection of one contact sheet within the depression of the adjacent contact sheet. It is preferred that the positive lock be formed by flattening the projection-depression coupling substantially in a direction perpendicular to the plane of the contact sheet.

The positive lock 36 maintains a connection between the contact sheets 10 and 22. Unlike a friction fitting, the positive lock 36 connects the two contact sheets 10 and 22 in such a manner that pulling them apart in a direction opposite to each other normally cannot separate the sheets. It should be understood, of course, that excessive force, that is a force well in excess of any separative force encountered in most applications of contact bodies, could possibly separate the contact sheets, but not without destruction of the positive lock(s) and/or the adverse deformation of the contact sheets themselves. Such force is usually not accidentally or inadvertently applied. Thus, once a positive lock in accordance with the present invention is formed, the contact body is assured of structural integrity to the extent that individual contact sheets will not separate from one another in their usual and intended various uses and environments.

Figure 5:
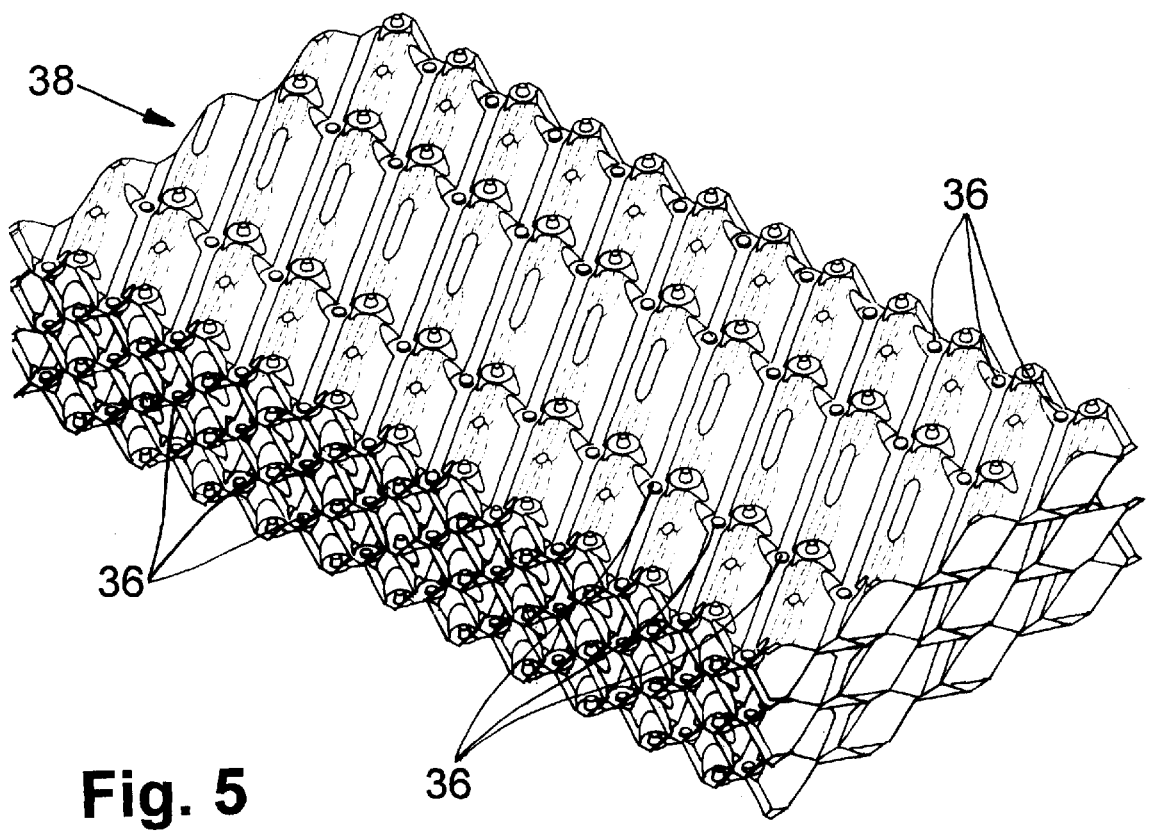
FIG. 5 is an isometric view of a contact body in accordance with a particular embodiment of the present invention made from several contact sheets.

FIG. 5 shows a contact body 38 in accordance with the present invention. The contact body 38 is comprised of several contact sheets in accordance with the present invention. The contact sheets are positioned adjacent to each other such that the projections of one sheet are within the depressions of another sheet, thereby forming projection-depression couplings. Several couplings are then crushed to form positive locks 36 such that they are substantially flat.

Figure 6:
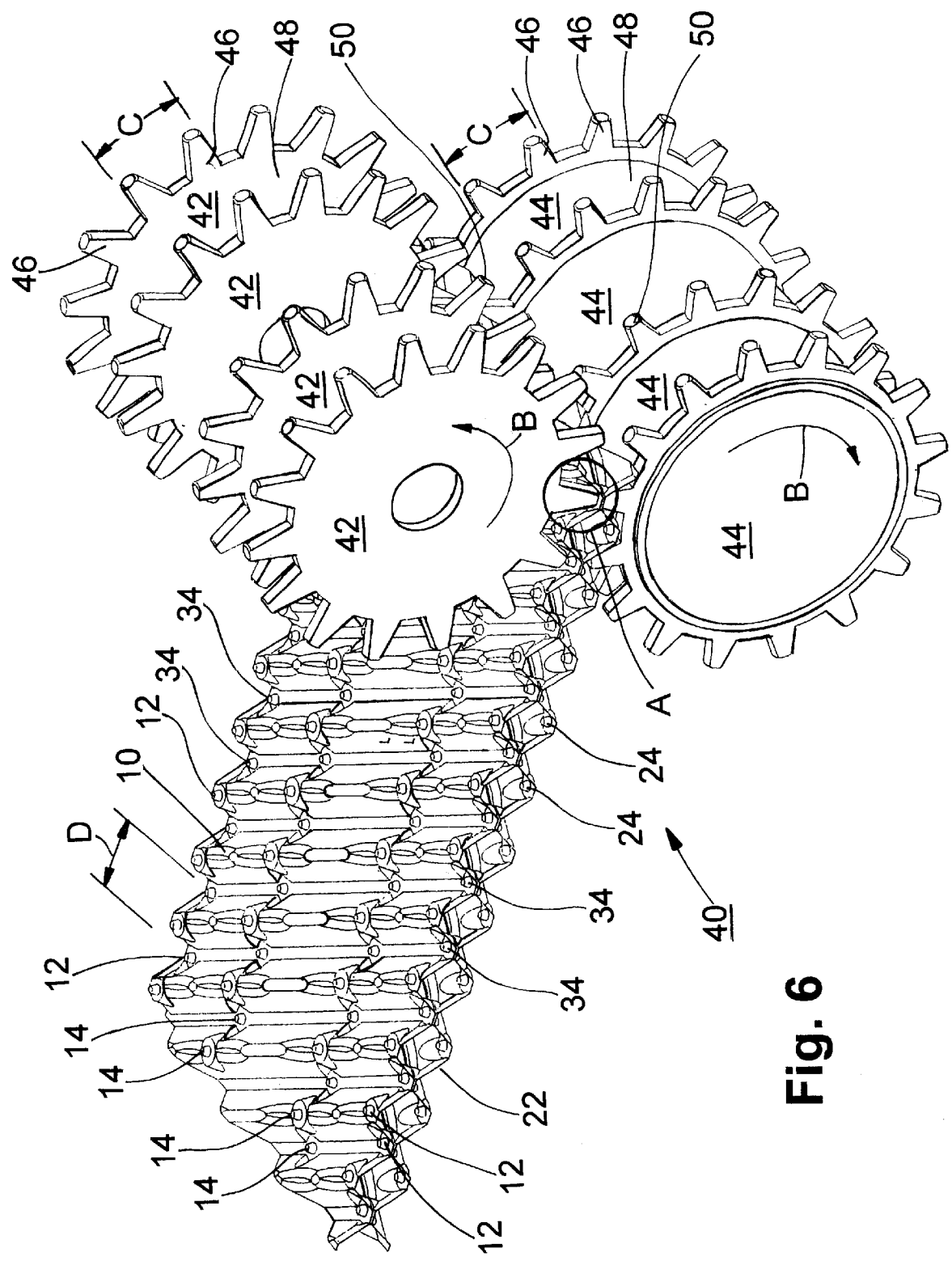
FIG. 6 is an isometric view of a pair of contact sheets positioned for feeding through a crimping device schematically illustrated in accordance with a particular preferred embodiment of the present invention.

In a particularly preferred embodiment of the present invention, two contact sheets in accordance with the present invention are positioned adjacent to each other such that the projections of one sheet are within the depressions of the adjacent sheet, thereby forming projection-depression couplings. The pair of contact sheets is then fed through a crimping device that can crimp or crush at least some, and preferably all of the projection-depression couplings to form positive locks. While it is not required, for the sake of efficient manufacture on a commercial scale, preferably, at least two projection-depression couplings, and more preferably, all laterally aligned projection-depression couplings in each two-sheet arrangement are deformed substantially simultaneously to form the corresponding positive locks. One crimping apparatus capable of such efficiency is crimping device 40, includes crimping gears shown schematically in FIG. 6, without any housing or drive mechanism shown for the sake of a more clear illustration. The crimping device deforms the projection-depression couplings across the entire width of the contact sheets, thereby forming positive locks between the two contact sheets. The crimping device 40 comprises a number of pairs of upper gears 42 and opposed lower gears 44, where each pair of gears comprises an upper gear and a lower gear. The number and alignment of gears corresponds to the number and alignment of projection-depression couplings across the width of the pair of adjacent contact sheets. As shown in FIG. 6, for example, there are four pairs of upper gears 42 and lower gears 44, corresponding to the four projection-depression couplings 34 across the width of the pair of contact sheets. It should be understood that any number of pairs of gears could be used to correspond to the number of projection-depression couplings along a given width, and preferably, the entire width, of a pair of contact sheets.

Figure 7:
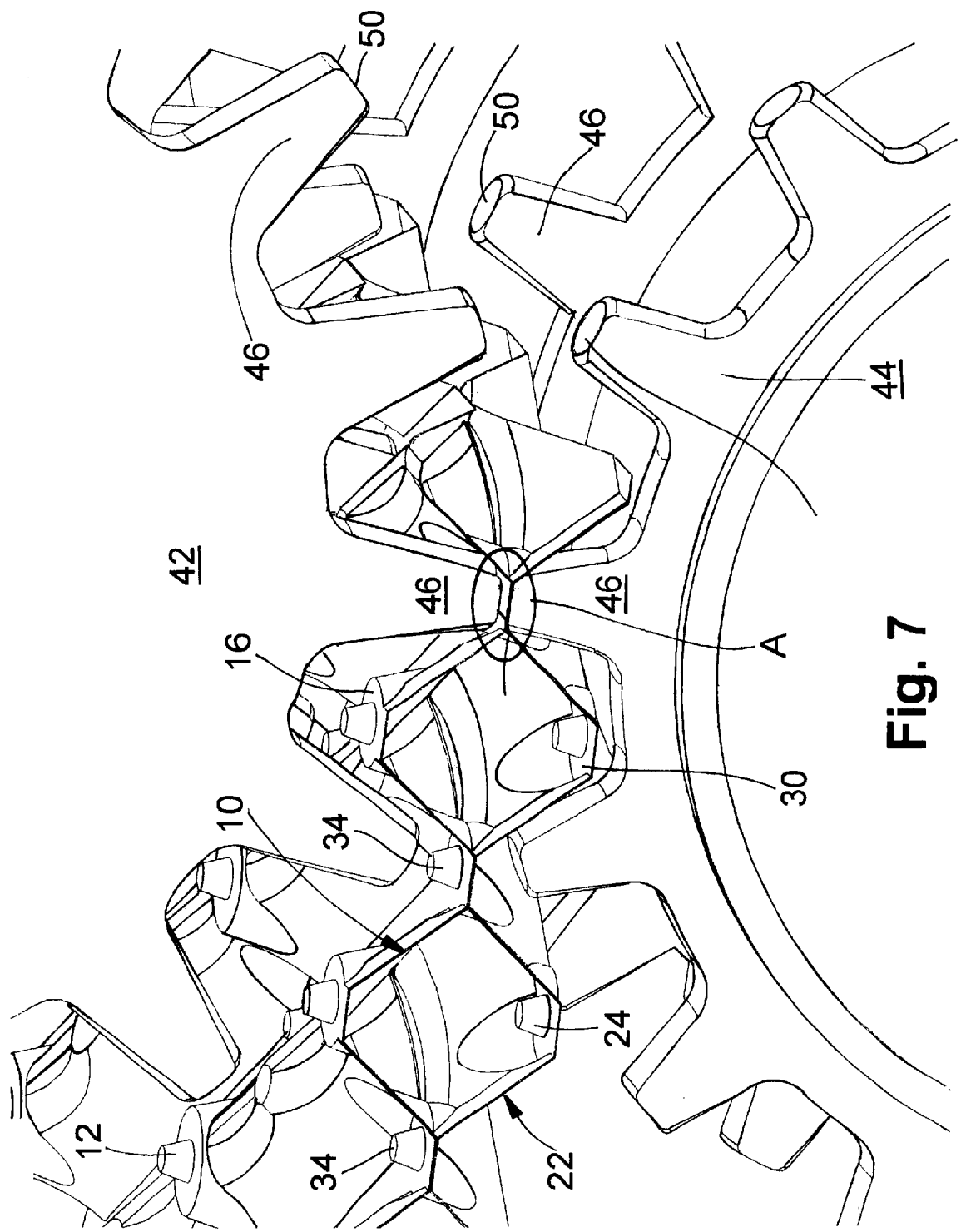
FIG. 7 is an enlarged isometric view of the area of a positive lock formation using the crimping device of FIG. 6.

Each of the upper crimping gears 42 and lower crimping gears 44 has elongated teeth 46 protruding radially from the circumference of the crimping gear body 48. Each of the teeth has a crimping surface 50. As shown in FIG. 7, the elongated teeth 46 are long enough such that the crimping surfaces 50 contact and deform the projection-depression couplings 34 without the teeth contacting the walls of the crests 16 and 28, and valleys 18 and 30 of the contact sheets. The elongated teeth are spaced along the circumference of the gear body such that they contact successive projection-depression couplings 34 on opposite surfaces of the pair of sheets simultaneously in area "A" as shown in FIG. 6 and in enlarged detail in FIG. 7, as the crimping gears rotate in the direction indicated by arrows B in FIG. 6. The arcuate spacing C of the tips of the teeth 46 corresponds to the spacing D of the projection-depression couplings 34. The crimping surface 50 at the tip of each elongated tooth 46 is preferably flat and smooth, although other surface configurations, such as convex, concave, ridged, etc. can be used.

After pairs of contact sheets have been connected by forming positive locks 36 between the projection-depression couplings 34, including those projection-depression couplings located at the edges and interior of the contact sheets, two pairs of connected contact sheets can be connected to each other. Any manual tool or manually-actuated or power-actuated apparatus can be used to make positive locks by deforming as few or as many of the projection-depression couplings as desired that are formed by interlocking one or more sheets together, or by interlocking one sheet with a pre-joined pair or any other number of sheets, to build up a contact body of any desired number of sheets. All of the projection-depression couplings formed by interlocking sheets may be deformed manually or by automated pinching, crimping or twisting jaws located adjacent one surface of the sheet or contact body, say the upper surface, for example. When an assembly of more than two sheets is being made, it may be difficult to make flattened positive locks from the projection-depression couplings formed from the interior projections and corresponding depressions. This is because it may be difficult to apply sufficient force on such interior couplings of multiple sheets by using apparatus that deforms the couplings by exerting force perpendicular to the plane of the contact sheets, such as opposed tool contact surfaces on opposite surfaces of the pre-joined contact sheets.

Rather than making positive locks using all of the projection-depression couplings (both at the interior and adjacent the side edges of all of the sheets) to lock together pairs of pre-joined contact sheets or by adding single contact sheets to pre-joined pairs (or more) of the contact sheets, very suitable contact bodies with excellent structural integrity can be made by forming positive locks only by deforming some or preferably all of the projection-depression couplings comprised of the edge projections 12 and 24 adjacent both side edges of the pairs of the contact sheets. Equipment for deforming the projection-depression couplings only adjacent the edges may take advantage of the ability to apply deforming compressive force on opposite surfaces of two sheets in a direction generally perpendicular to the plane of the sheets. Thus, pairs of pre-joined sheets may be attached together securely and efficiently by forming positive locks along the side edge couplings.

Similarly, additional single sheets may be joined to an assembly of two or more sheets one sheet at a time. However, a contact body with greater structural integrity is formed by joining together, along their side edges, pre-joined pairs of sheets, since the sheets of each pair may be and preferably are joined together by making positive locks at some and preferably all of the projection-depression couplings throughout the width and length of the sheets.

Figure 8:
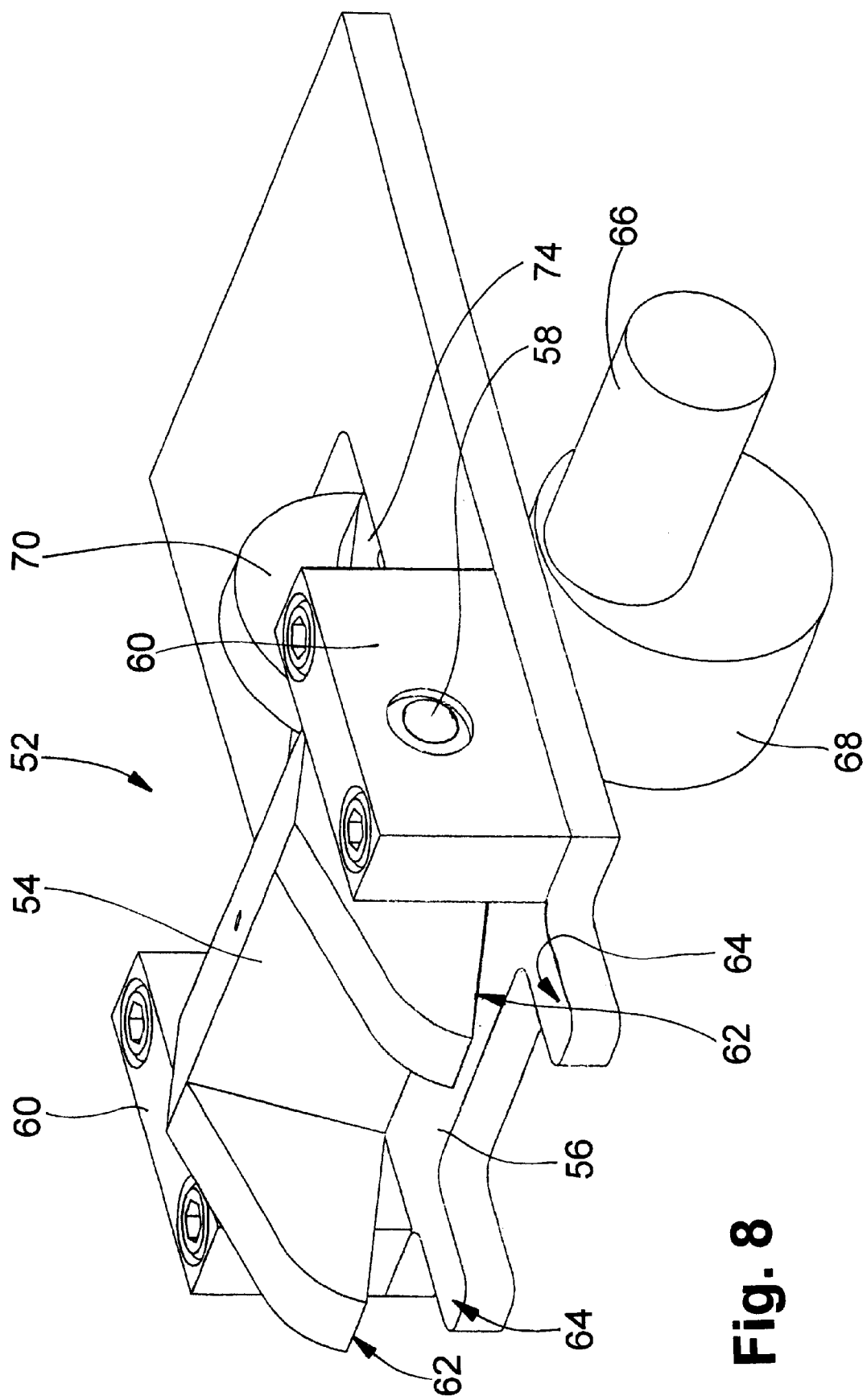
FIG. 8 is an enlarged isometric view of another crimping device in accordance with a particular preferred embodiment of the present invention, showing the crimping device in an open position.
Figure 9:
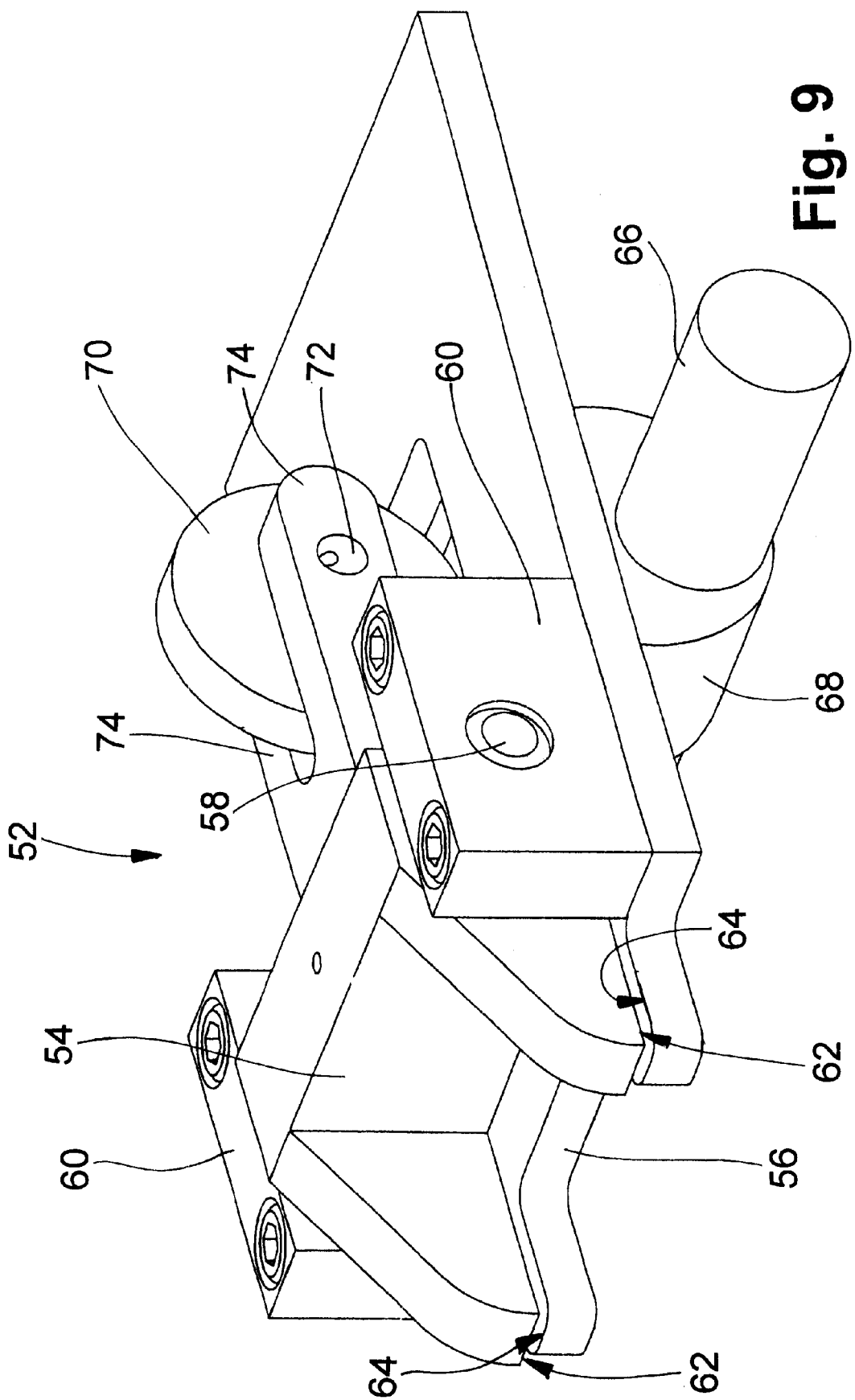
FIG. 9 is an enlarged isometric view of the crimping device shown in FIG. 8 in a closed position.

The projection-depression couplings along the edges of the pairs of contact sheets can be joined using a number of edge-crimping devices, such as the one shown in FIGS. 8 and 9. In FIG. 8, each edge-crimping device 52, capable of forming two positive locks 36 simultaneously along the edge of two pairs of contact sheets, is shown in an open position. The device 52 includes an upper crimping member 54 and a lower crimping member 56. In the particular embodiment illustrated, the upper crimping member 54 is movable and the lower crimping member 56 is stationary, functioning as an anvil for the movable upper crimping member 54. The upper crimping member 54 is mounted on a shaft 58, which can rotate in bearings within mounting blocks 58 and 60. In other designs, the movable and stationary members could be reversed. It only matters that the crimping members are movable relative to each other. The upper crimping member includes two downward-facing upper crimping surfaces 62 and the lower crimping member 56 including two upward-facing lower crimping surfaces 64 aligned with the upper crimping surfaces 62. It should also be understood that an edge-crimping device 52, as shown in FIGS. 8 and 9, can be adapted to include more, or fewer, upper crimping surfaces 62 and aligned lower crimping surfaces 64 such that the simultaneous formation of more, or fewer, positive locks is possible. Additionally, if desired, more than two pairs of joined sheets could be joined simultaneously by having multiple levels of crimping devices crimp the edge couplings.

FIG. 9 shows the crimping device 52 of FIG. 8 in a closed position. The crimping device 52 is closed by moving the upper crimping member 54 toward the lower crimping member using a cam arrangement, for example. The cam arrangement includes a manually or power driven cam shaft 66 connected to or unitarily formed in an offset manner with an eccentric cam 68. As shown in FIGS. 8 and 9, the eccentric cam 68 bears against a follower 70 mounted on a shaft 72 that rotates in bearings within arms 74 that are attached to or unitarily formed with the upper crimping member. Based on the angular position of the eccentric cam 68 with respect to the follower 70, the crimping device 52 is opened or closed. FIG. 8 shows the relationship between the cam and the follower that opens the crimping device, while FIG. 9 shows the relationship between the cam and follower that closes the crimping device, such that the crimping surfaces 62 and 64 apply deformation pressure to the projection-depression couplings 34 along the edges of the contact sheets, thus forming positive locks 36.

Several pairs of contact sheets, each pair being joined by positive locks across the width of the contact sheets, can be joined together at their edges by, for example, the crimping device 52 shown in FIGS. 8 and 9, to form a contact body in accordance with the present invention. Contact bodies so formed are durable, economically manufactured, maintain strong joints by way of positive locks and also exhibit excellent thermal performance at least partly as a result of their structural integrity.

The crimping devices of FIGS. 6–9 can be driven by electric, internal combustion, pneumatic, hydraulic or other motive power sources, in addition to manual power. Appropriate gearing, camming, drive belts and pulleys or chains and sprockets, and other associated mechanical components well known to those skilled in the motive power art could readily be provided with proper interconnections, as well as computer control systems, to properly and efficiently perform the crimping operations.

FIG. 10 is a cross-sectional and greatly enlarged view of a positive lock 36 in accordance with one particular embodiment of the present invention. FIG. 10 also shows in phantom (dashed) lines the projection-depression coupling 34 prior to being substantially flattened to form a positive lock 36. The positive lock 36 keeps contact sheet 10 together with contact sheet 22 in a substantially inseparable manner. The term "substantially flattened" as used herein means that the projection-depression coupling 34 has been forced toward or against the contact sheet 10 surface to such an extent to form the positive lock 36 that the sheets cannot be separated without destroying the coupling and/or adversely deforming the contact sheets. Preferably, but without limitation, the coupling 34 is flattened to form the positive lock 36 to such an extent that some part of the outer surface of the projections 12 or 14 is in contact with the contact sheet 10 surface, while maintaining a substantial amount of contact between the adjacent surfaces of the coupled projections 14 and 24. FIG. 10 shows an idealized embodiment where the projection-depression coupling is completely crushed into a positive lock 36 having a form like a flattened, interlocking rivet.

Figure 11:
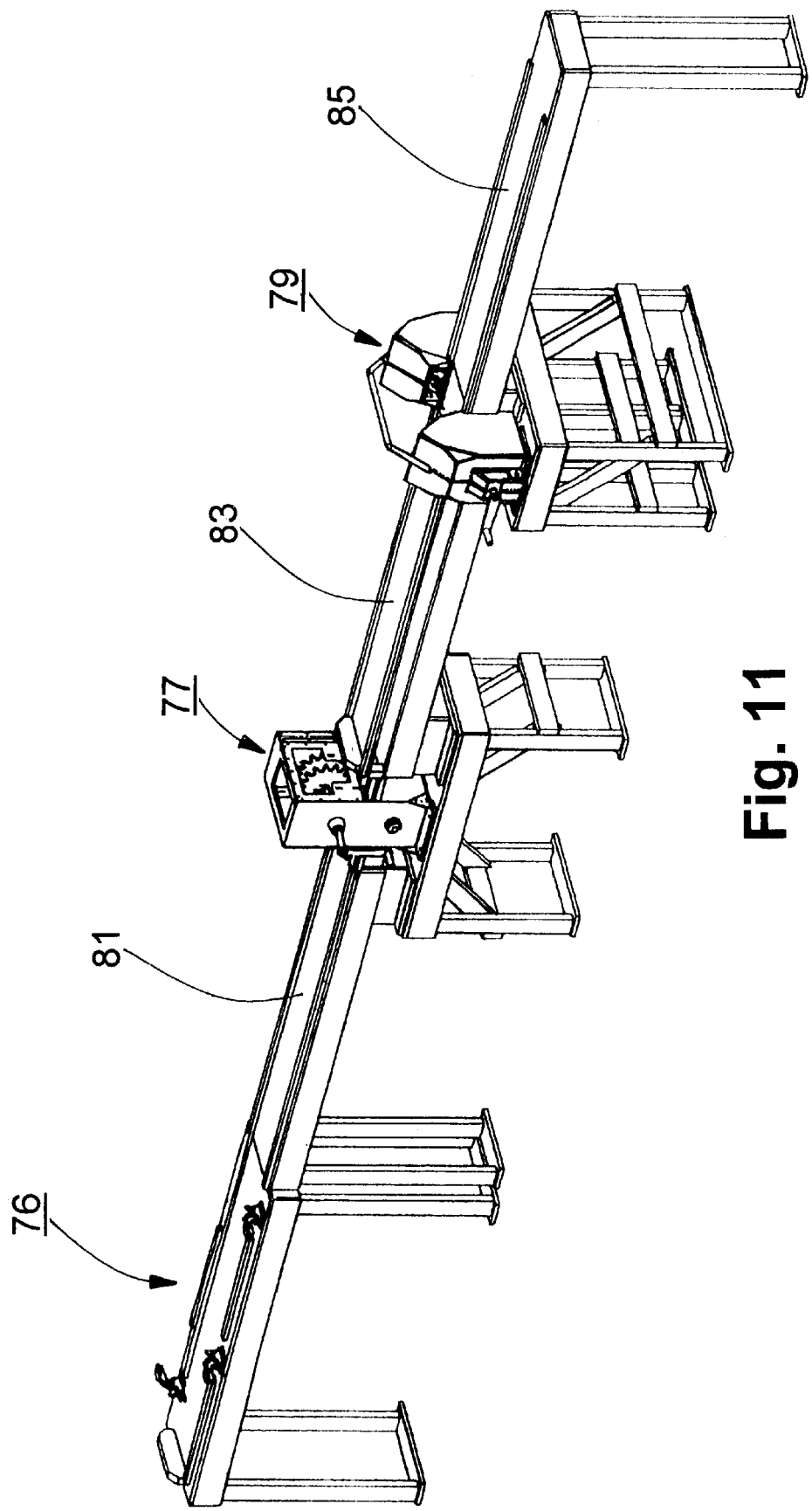
FIG. 11 is an isometric view of one embodiment of an apparatus used to make a contact body in accordance with a particular embodiment of the present invention, where the apparatus is readily transportable to a field location.

FIG. 11 illustrates one form of an assembly apparatus for crimping together interlocked portions of at least two sheets of deformable sheet material. While the sheet material may be contact sheets as described above, and the apparatus is particularly well-suited to that use, the apparatus could also be used to crimp together interlocked portions of deformable material in which a projection is located within a depression and retained by mechanical deformation such as crimping, regardless of whether the sheets have corrugations or not. Nevertheless, the apparatus is very well suited to crimp together corrugated sheets where it is difficult to apply sufficient mechanical pressure to all of the projection-depression couplings. Additionally, although the apparatus of FIG. 11 could be automated and powered by electric, internal combustion, pneumatic or hydraulic motive power, the apparatus is intended primarily for assembling sheets such as contact sheets to form contact bodies at a field location, such as where a cooling tower or other evaporative heat exchanger is located and is being built or repaired.

The assembly apparatus of FIG. 11 includes an optional, but preferred preliminary station 76 for aligning and initially retaining together a pair of sheets. The preassembled sheets are then transferred, typically by hand, over a connecting support surface, such as support table 81, to a first stage crimping device 77. In crimping device 77, some or all of the projection-depression couplings are deformed by crimping to form a plurality of positive locks that provide the structure of typically two sheets with great structural integrity. From there, the assembled sheets are conveyed over another support surface, such as support table 83, to a second stage crimping device 79. The second stage crimping device 79, particularly well adapted for use in the field, deforms some or all of the edge projection-depression couplings, depending on the shape, number and placement of the tools, by crimping the edge projection-depression couplings of the preformed subassembly resulting from crimping device 77 to another or successive sheets or subassemblies added to the bottom of the first or subsequent added subassemblies. A contact body or other structure having high structural integrity is formed by crimping some, preferably a majority, and more preferably substantially all or all of the projection-depression couplings formed along the edges of a plurality of subassemblies, where each subassembly has been assembled by deforming some, preferably a majority, and more preferably substantially all or all of the projection-depression couplings to form the subassembly. Thus, every other layer preferably is fully joined by positive locks made by deforming projection-depression couplings throughout its edges and interior structure, while every remaining other layer is joined preferably substantially fully along its side edges. This technique creates a strong and durable assembly such as a contact body. As the intended product is assembled, by passing through the crimping device 79, the subassemblies or completed assemblies are supported by a support surface, such as support table 85.

Figure 12:
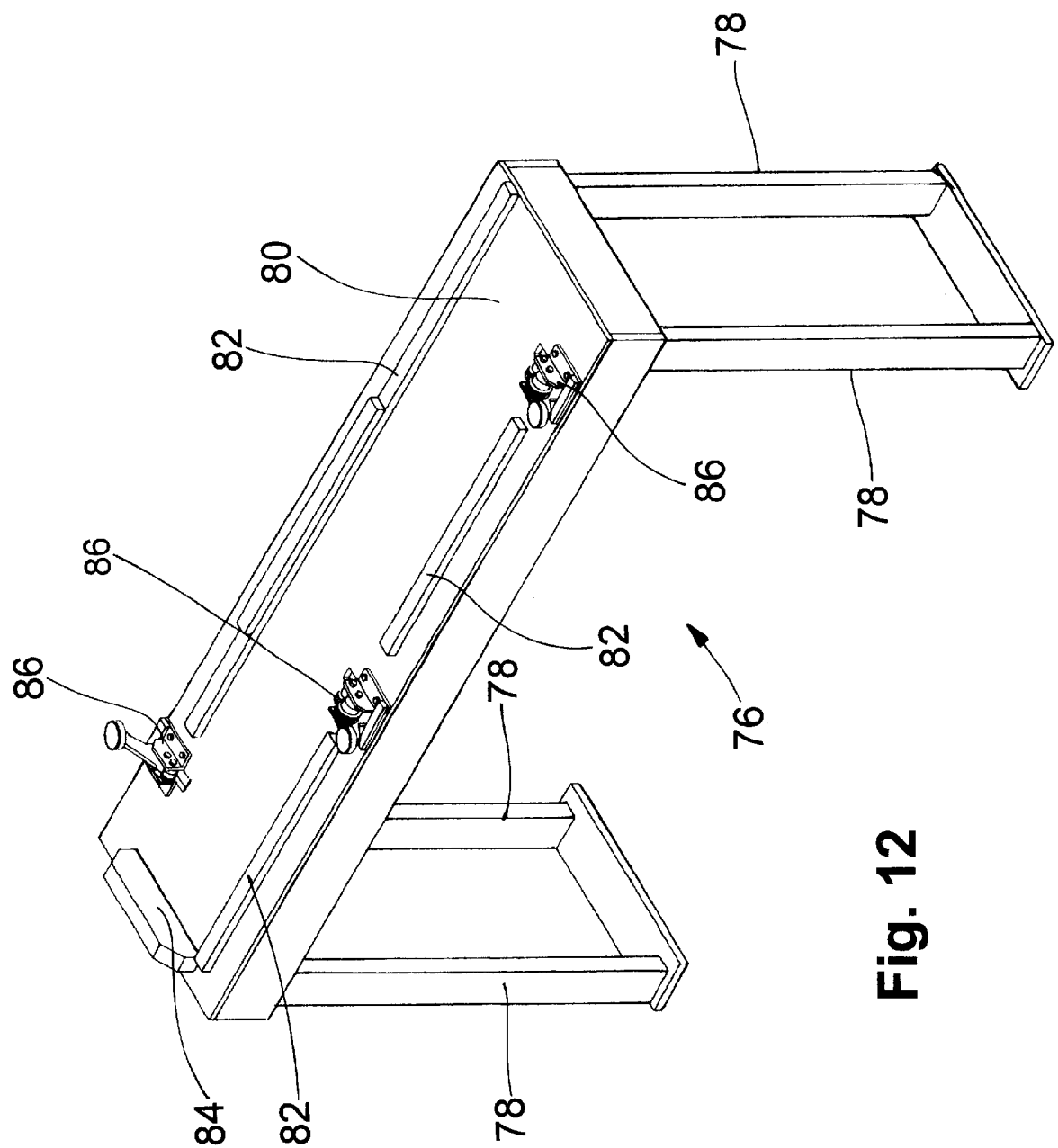
FIG. 12 is an isometric view of a preliminary alignment station in accordance with a particular preferred embodiment of the present invention, forming a component of the apparatus shown in FIG. 11.

With reference to the operative components of the apparatus of FIG. 11, an optional preliminary alignment and retention assembly unit 76, illustrated in more detail in FIG. 12, is preferably used. Unit 76 affords the user the ability to align sheets, preferably a pair of sheets, such that the projections on the crests of a bottom sheet are located in the depressions formed in the valleys of the top sheet. Also preferably by using the unit 76, at least one projection-depression coupling is deformed to retain the alignment of the sheets. More preferably at least two projection-depression couplings are deformed to retain the alignment of the sheets and make further handling of the aligned sheets easier.

The preliminary alignment and retention unit 76 shown in FIG. 12 includes legs 78 supporting a table having a sheet support surface 80. Sheet side edge guides 82 and an end edge guide 84 are attached to the table at locations matching the width and length of the sheets to be aligned and pre-joined using the unit. At least one crimping device, and as shown in FIG. 12, three crimping devices 86 are located on the table to crimp edge projection-depression couplings and retain at least two pre-joined sheets in alignment once they are aligned by hand.

Figure 13:
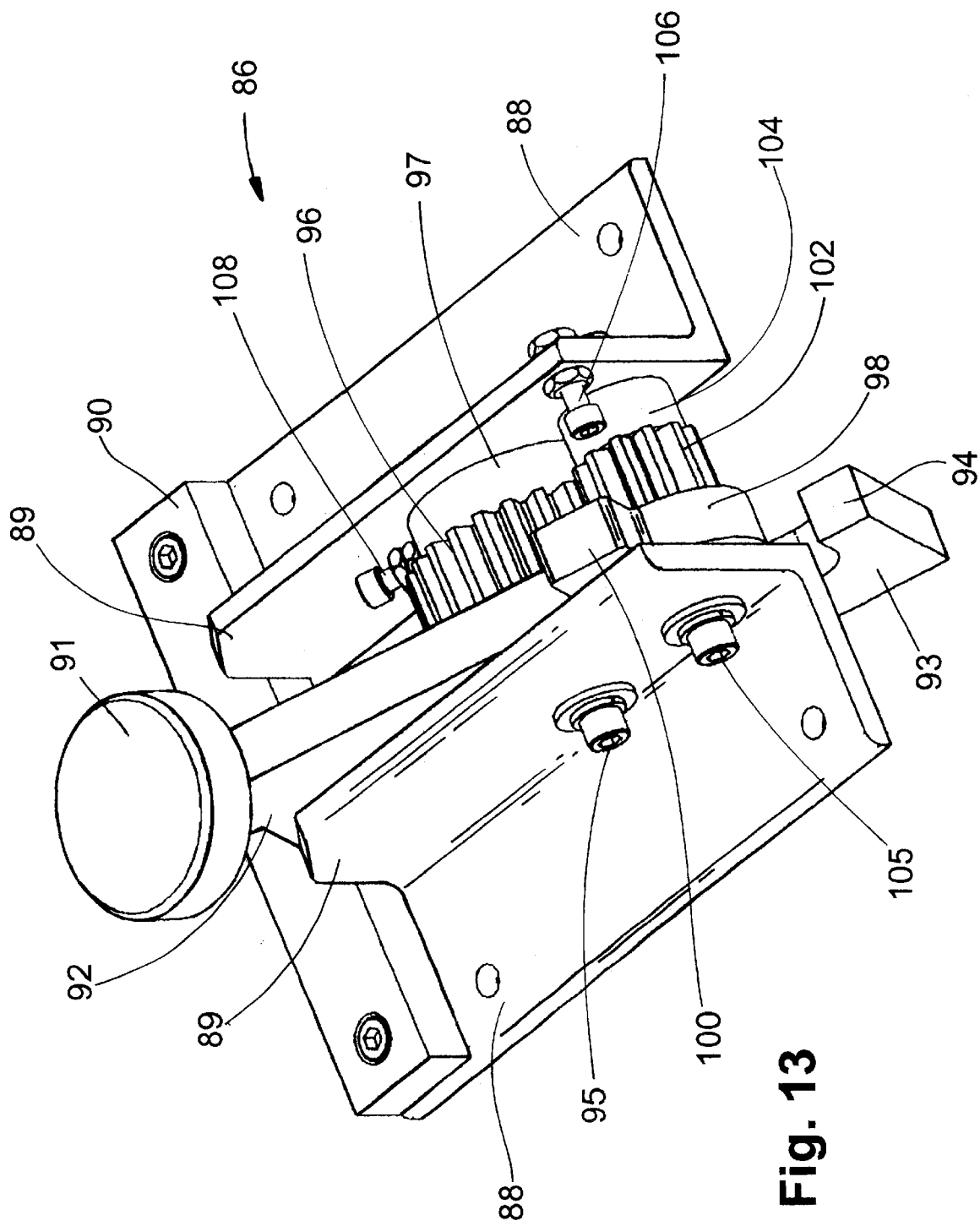
FIG. 13 is an isometric view of a manually actuated crimping device in accordance with a particular preferred embodiment of the present invention for use with the apparatus illustrated in FIGS. 11 and 12.

FIG. 13 illustrates one type of edge crimping device 86 suitable for use with the preliminary alignment and retention unit 76 shown in FIGS. 11 and 12. The crimping device includes a U-shaped mounting bracket 88 having upstanding flanges 89. The mounting bracket allows ready attachment to the support surface of a table, such as surface 80, by screws or other fasteners. The devices 86 are mounted on the table around rectangular holes in the support surface so that there is space for a lower crimping jaw of the device to move upwardly from a location below the surface. A stop member 90 used to limit the travel of an actuator is attached to a portion of the mounting block 88 that connects the arms of the mounting block.

The crimping device 86 also includes a manual actuator 91 that can be pressed with a user's hand, a mallet or other pressing or striking tool. If desired, the crimping device could be actuated by motive power, such as by a motor driving a cam or gear arrangement. The actuator 91 is unitarily formed with or attached to a Z-shaped arm 92. A lower crimping jaw 93 is unitarily formed or otherwise attached to the arm 92 at the end opposite the end including actuator 91. The tip of the crimping jaw 93 has a crimping surface 94 that contacts the projection-depression coupling to be deformed by crimping. The arm 92 is attached to a first shaft 95 that is rotatably mounted in bearings or bushings on the flanges 89 of the mounting block 88. A driving gear 96 with its unitarily formed hub 97 is also attached to the shaft 95. An upper crimping jaw 98 including a crimping surface 100, along with a driven gear 102 with its unitarily formed hub 104 are attached to a second shaft 105 rotatably mounted in bearings or bushings on the flanges 89 of the mounting block 88. A tensioning coil spring, not shown for the sake of better illustration, is attached at its opposite ends to a spring pin 106 attached to a flange 89 of the mounting block and to a spring pin 108 attached to the hub 97 of the driving gear 96. The spring allows the crimping device to be in a normally open condition as illustrated in FIG. 13 until the crimping device is actuated.

The crimping device 86 operates by the user pushing down on the actuator 91. This action causes the lower crimping jaw 93 to move upwardly as the Z-shaped arm 92 rotates around the shaft 95. The rotation of the shaft 95 causes the gear 96 to drive the gear 102, which in turn causes the upper crimping jaw 98 to move downwardly as shaft 105 rotates with the gear 102. As the lower and upper crimping jaws 93 and 98 move toward each other, their respective crimping surfaces 94 and 100 approach each other and deform by crimping any projection-depression coupling that is aligned between them. When the force pushing down on the actuator 91 is released, the spring returns the crimping device to the open position.

Figure 14:
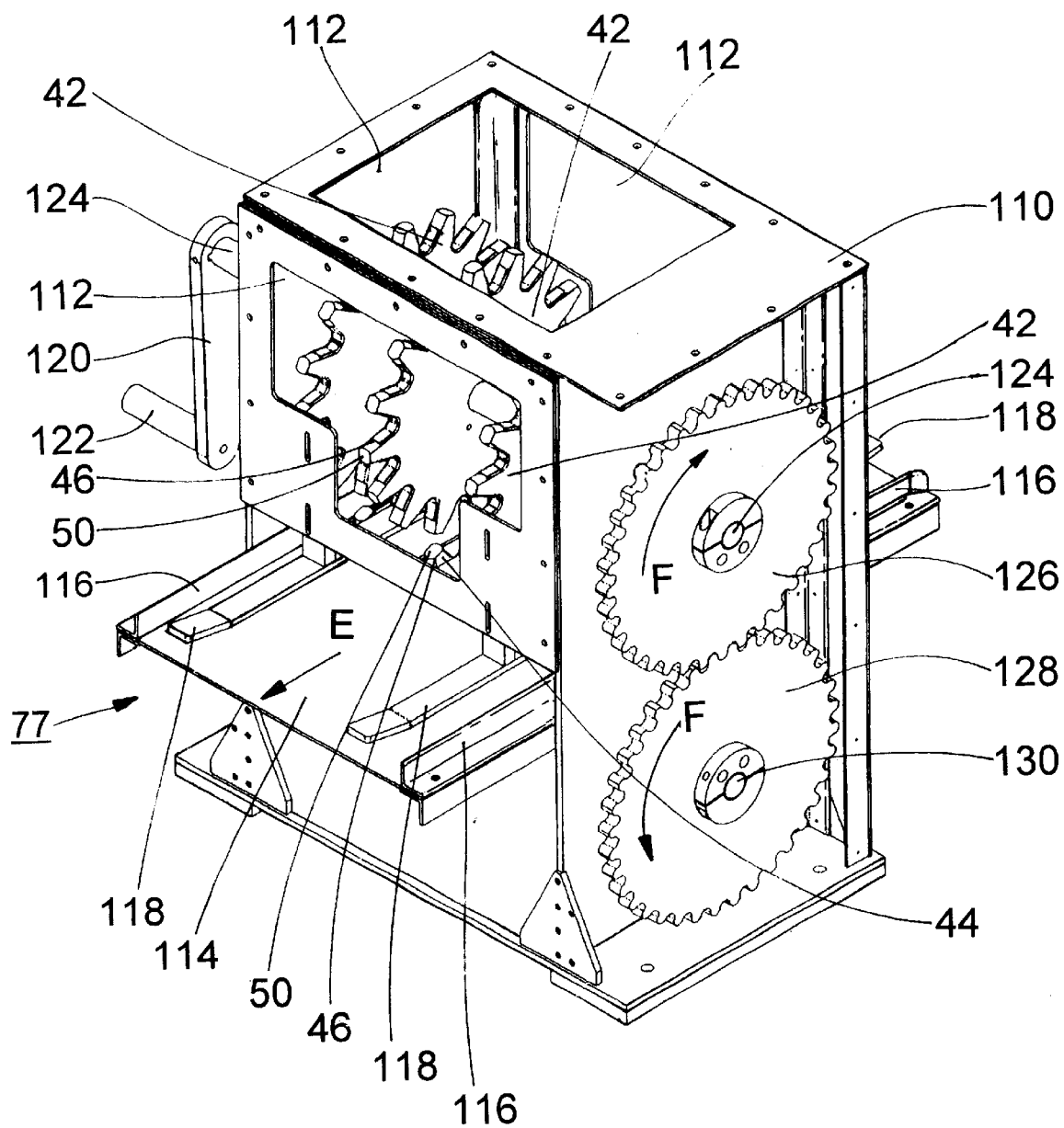
FIG. 14 is an isometric view of a crimping device in accordance with another particular preferred embodiment of the present invention, having portions of its housing removed for ease of illustration, of a type useful in the apparatus shown in FIG. 11.

FIG. 14 illustrates one presently preferred embodiment of a crimping device 77 useful particularly for field installations. The crimping device 77 includes a housing 110, from which a side panel and a portion of a front panel have been removed for the sake of a more clear illustration. If desired, particularly to assure continued alignment and positive operation, windows 112 of polycarbonate, polyacrylate or other durable, transparent material can be formed in one or more of the sidewalls and top of the housing. A support surface 114 supports a pair of sheets that preferably have been prealigned and initially secured in the optional preassembly station 76. The direction of travel of the sheets through device 77 is indicated by direction arrow E. Side edge guide rails 116 adjusted to the proper width of the sheets being assembled are attached to the support surface 114. Upper surface guide members 118 are attached to the housing to retain the proper alignment of the pair of sheets passing though the device 77 by limiting the upper movement of the sheets in the device.

The crimping device 77 includes a crank 120 having a handle 122 attached to one end. The other end of the crank 120 is attached to a shaft 124. If desired, the crank and handle could be attached to the opposite side of the crimping device or another handle and crank could be attached to the opposite side, such that the crimping device could be operated from either side of the device. While the crank and handle make for easy manual operation of the crimping device, the crimping device is readily adaptable for actuation by motive power, such as by a motor driven sprocket and chain, belt and pulley or shaft and gear drive chains. Also mounted on the shaft 124 are a number of upper crimping gears 42 of the type shown and described with respect to FIGS. 6 and 7. The number of crimping gears should match the number of lateral rows of projection-depression couplings present across the sheet pair. There are four crimping gears used in the exemplary crimping device 77, consistent with the number of rows of such couplings in the exemplary contact sheets. The crimping gears are aligned with each row of projection-depression couplings. A driving gear 126 is also mounted on the shaft 124. The teeth of the driving gear 126 mesh with the teeth on a driven gear 128 that is mounted on a shaft 130. A number of lower crimping gears 44 corresponding to the number of upper crimping gears 42 are mounted on the shaft 130 and aligned with the upper crimping gears 42.

To operate the crimping device 77, a pair of sheets is inserted into the upstream end of the device under the upper surface guide members 118 until the leading edge of the sheets contact the teeth 44 of the upper and lower crimping gears, at which time the sheets may be pushed farther into the device so that the crimping surfaces just contact the first aligned series of projection-depression couplings. The user then turns the handle 122 to rotate the gears 126 and 128 in the direction indicated by arrows F. Turning the handle causes the upper and lower crimping gears to rotate. The teeth 46 pull the pair of sheets through the crimping device as the crimping surfaces 50 deform the projection-depression couplings passing between them to form positive locks. Preferably, all of the couplings throughout the length and width of the sheets are deformed by crimping to form the positive locks, although if desired, less than all of the couplings could be so deformed.

As the joined pair of sheets exits the crimping device 77, they are deposited onto a support table 83 prior to entering the next station comprising an edge crimping device 79 that is used to attach pairs of preassembled sheets together to form a contact body of any desired number of sheets.

Figure 15:
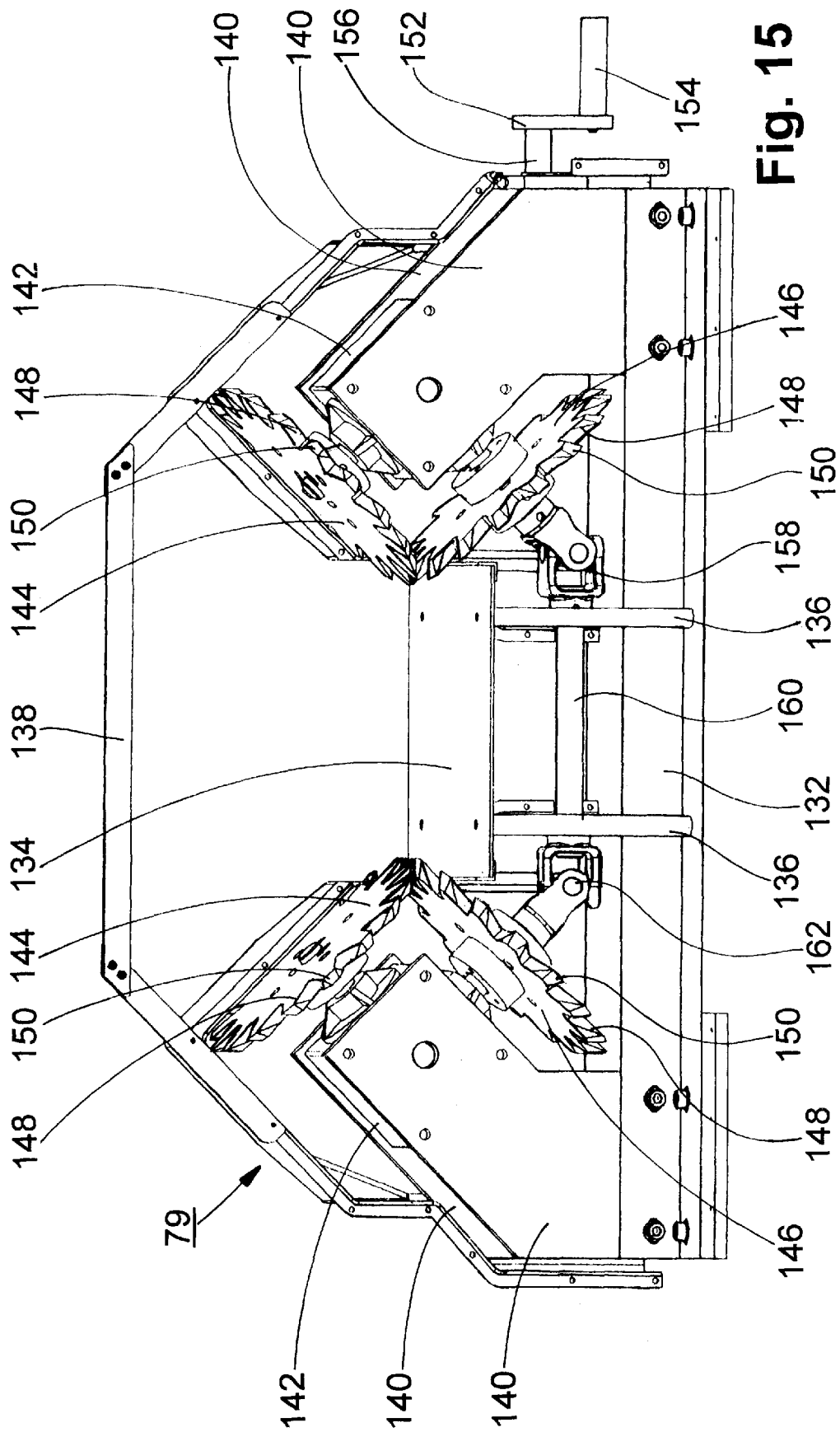
FIG. 15 is a rear isometric view of an edge crimping device in accordance with another preferred embodiment of the present invention, also having portions of its housing removed for ease of illustration, that is well suited for use in the apparatus shown in FIG. 11.

Details of the crimping device 79 are shown in FIG. 15, a rear isometric view, where the device is shown without its housing for the sake of a more clear illustration. The crimping device 79 includes a support structure 132 that supports a contact body support surface 134 by legs 136. An optional contact body height guide bar 138 is provided to make it easy to determine when the desired number of pairs of contact sheets are joined or the desired number of individual sheets are joined to the previously assembled stack of contact sheets, to make the contact body. Two pairs of gearbox support walls 140 are attached to the support structure 132 to support gearboxes 142 on opposite sides of the contact body. The gearboxes contain appropriate shafts, gears and joints to drive upper crimping gears 144 and lower crimping gears 146. The crimping gears have teeth 146 ending in beveled crimping surfaces 150. The upper crimping gears 144 are oriented with respect to the lower crimping gears 146 and the side edges of the contact sheets being formed into contact bodies in a manner such that the projection-depression couplings along each edge are deformed by crimping between the crimping surfaces 150 of each pair of upper and lower crimping gears as the contact sheets move through the crimping device 79.

The crimping device 79 also includes a crank 152 having a handle 154 attached to one end. The other end of the crank 152 is attached to a shaft 156. If desired, the crank and handle could be attached to the opposite side of the crimping device or another handle and crank could be attached to the opposite side, such that the crimping device could be operated from either side of the device. While the crank and handle make for easy manual operation of the crimping device, the crimping device is readily adaptable for actuation by motive power, such as by a motor driven sprocket and chain, belt and pulley or shaft and gear drive chains. The other end of the shaft 156 is attached to a universal joint, which is hidden by a gearbox support wall 140 shown on the right-hand side of FIG. 15. That universal joint is also attached to a first shaft (not shown) entering the gearbox 142 shown on the right-hand side of FIG. 15. Mounted on that first shaft in the gearbox is a driving gear that drives another gear mounted in the gearbox on a second shaft at a right angle to the first shaft. Also mounted on the first shaft is the upper crimping gear 144 shown on the right-hand side of FIG. 15. The lower crimping gear 146 shown on the right-hand side of FIG. 15 is mounted on a portion of the second shaft extending from the gearbox. A depending end of the second shaft is attached to a universal joint 158 that in turn is attached to one end of a shaft 160. The other end of the shaft 160 is attached to another universal joint 162. The universal joint 162 is attached to an end of a shaft on which the lower crimping gear 146 shown on the left-hand side of FIG. 15 is mounted. The other end of that shaft extends into the gear box 142 shown on the left-hand side of FIG. 15, which has a similar gear and shaft arrangement as the gear box 142 shown on the right-hand side of FIG. 15.

The gearbox and other drive chain arrangements are such that the rotation of the handle 154 causes the upper and lower crimping gears to rotate in opposite directions to move the contact sheets and partially or fully assembled contact body made from them in a direction corresponding to a direction perpendicular to and into the plane of the drawing sheet of FIG. 15. As the crimping gears rotate, the beveled crimping surfaces 150 deform by crimping between them the projection-depression couplings to form positive locks preferably all along each side edge of the contact sheets. When one pass is made though the crimping device 79 to attach one pair of contact sheets to another pair or to an additional single sheet, the assembly so made is supported by the support table 85. If successive pairs or single sheets are to be added to the assembly previously passing though the crimping device 79, each successive pair of pre-joined sheets or each additional single sheet is placed on the support table 83 and the previously assembled sheets or contact body is placed on top of the pair or single sheet. This assembly is then run again through the crimping device 79 to attach the lower pair of sheets or single sheet to the previously joined assembly. The process is repeated until a contact body or other assembly of the desired number of sheets is completed.

The apparatus illustrated in FIGS. 11–15 is well suited for crimping at least two projection-depression couplings together simultaneously. It is most preferred that the at least two substantially simultaneous crimping operations being performed using each of the crimping devices 77 and 79 form positive locks along both side edges of the sheets being assembled together. However, if desired, the crimping devices can have crimping tools along only one side edge of the sheets. This would usually result in running the sheets though the crimping devices a second time so that positive locks could be formed at least adjacent the other side edges of the sheets. While this would require additional labor, such an arrangement may be justified by lower cost of such equipment, particularly where smaller assembly jobs are involved.

Figure 16:
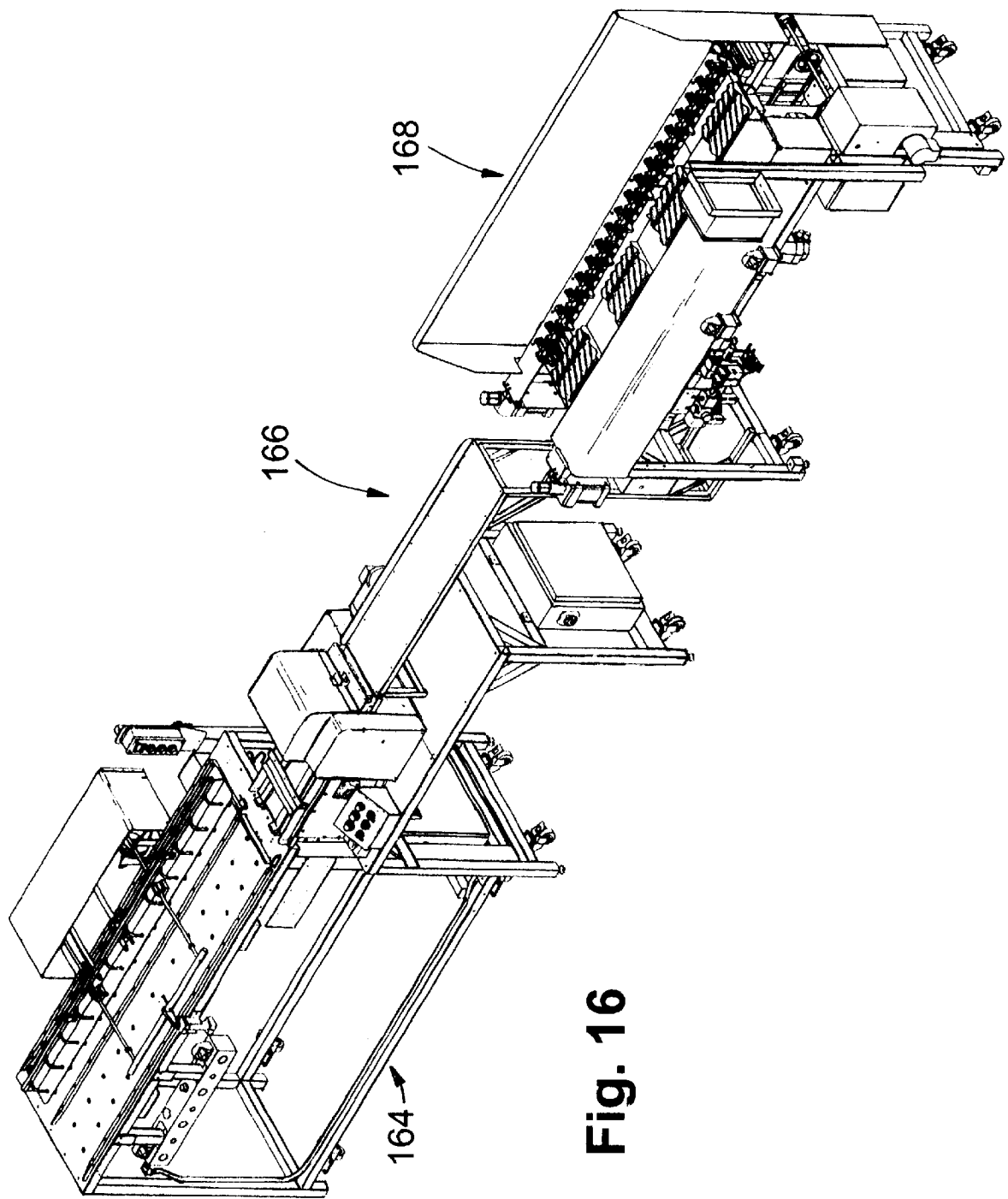
FIG. 16 is a left side isometric view of another embodiment of an apparatus for crimping together interlocked portions of at least two sheets of deformable sheet material in accordance with a particular preferred embodiment of the present invention, wherein the apparatus is suitable for a higher production, more permanent factory installation than the apparatus illustrated in FIG. 11.

FIG. 16 illustrates another embodiment of an apparatus for crimping together interlocked portions of at least two sheets of deformable sheet material in accordance with a particular preferred embodiment of the present invention, wherein the apparatus is suitable for a higher production, more permanent factory installation than the apparatus illustrated in FIG. 11. This apparatus comprises an optional but preferred preliminary station 164 to pick and place and align a pair of sheets together before they are moved to the first crimping station. The apparatus also comprises a first crimping device 166 that forms positive locks between the pair of sheets by deforming some, preferably a majority, and most preferably substantially all or all of the projection-depression couplings present in the sheets. The apparatus further comprises another crimping device 168 that crimps the projection-depression couplings along the side edges of the sheets. This apparatus is intended to be operated using motive power, rather than manually, but the apparatus may be outfitted for manual operation if desired. The apparatus of FIG. 16 is preferably located near the location where the sheets are made by thermoforming or other manufacturing technique. This makes the overall sheet formation and assembly operation more efficient, in that the sheets being formed are assembled promptly, rather than going into inventory. In at least some instances, it may be preferred to ship the sheets to a job site for field assembly. The apparatus shown in FIG. 16 could certainly be used for field assembly of the sheets, but the cost of manufacturing and shipping such apparatus may make it more economical to make the contact bodies or other assembly of sheets at or near the place where the sheets are made and ship such assemblies to the job site.

Figure 17:
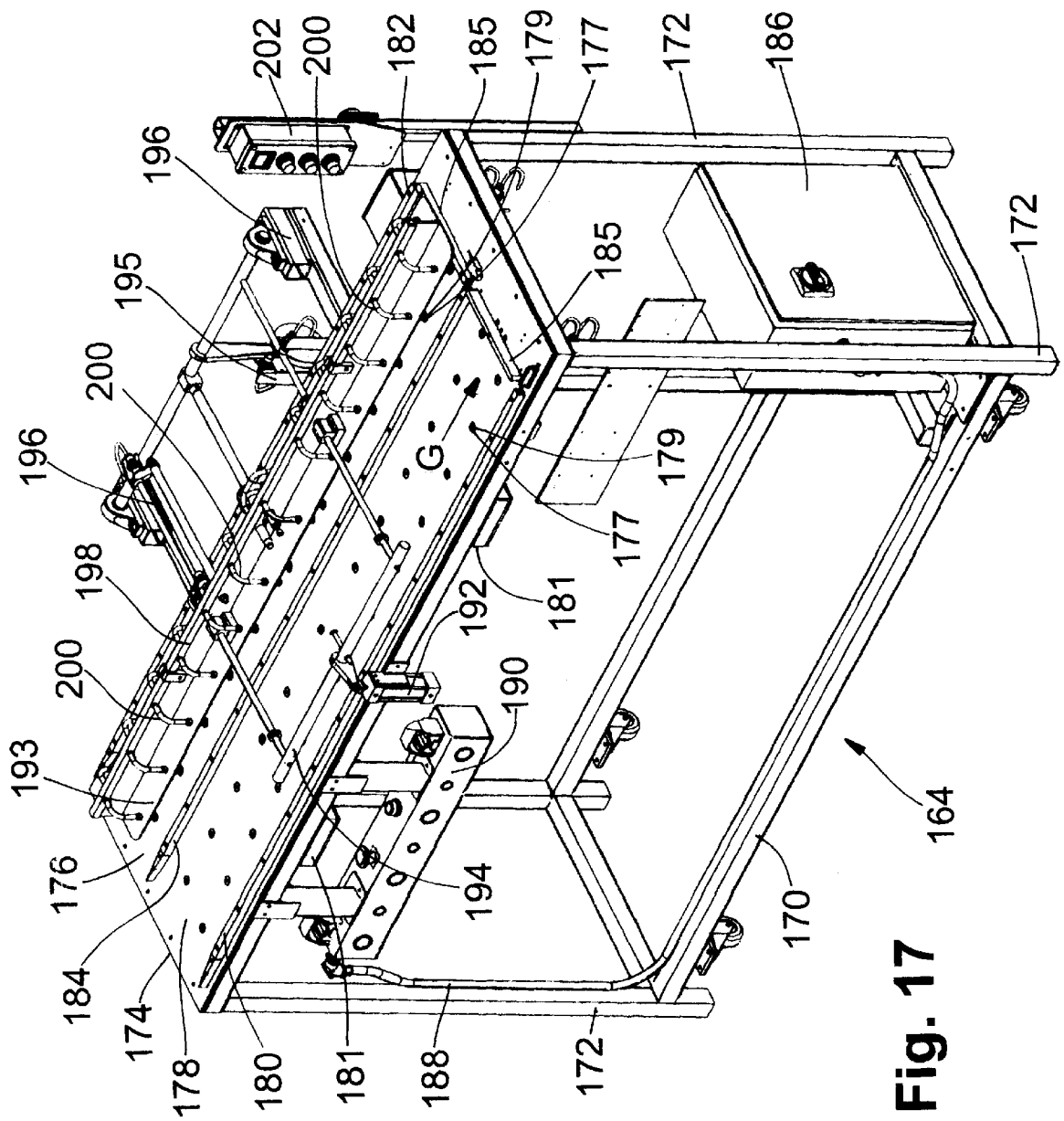
FIG. 17 is a left-side isometric view of an alignment and pre-assembly apparatus in accordance with a particular embodiment of the present invention, having portions of its housing removed for ease of illustration, used to pick and place sheet material prior to a crimping operation using an apparatus such as that illustrated in FIG. 16.

FIG. 17 shows the optional but preferred alignment and pre-assembly apparatus 164 in accordance with a particular embodiment of the present invention used to pick and place sheet material prior to a crimping operation preferably using the other stations in an apparatus such as that illustrated in FIG. 16. Portions of the housing of the apparatus 164 have been removed in FIG. 17 for better clarity of illustration. The pick and place apparatus 164 is preferably located near the end of the equipment used to make the sheets to be assembled using the apparatus shown in FIG. 16, for the reasons noted above.

The apparatus 164 includes a table with a support structure 170 having legs 172. A sheet support surface 174 is divided into two adjacent sides. A first side 176 contains one or a stack of sheets and may be considered to be the feeding side of the sheet support surface. A second side 178 receives sheets from the first side 176 and may be considered the fed side of the sheet support surface. Side guide rails 180 and 182 are attached to the sheet support surface 174, as is a middle guide rail 184. The middle guide rail 184 acts as one side guide rail for the side edges of opposite sides of the sheets on each of the first and second sides 176, 178 of the sheet support surface. The other side guide rails 180 and 182 form the guide rails for the opposite side edges of the sheets on the first and second sides 176, 178 of the sheet support surface. End guide rails or stops 185 are also attached to the sheet support surface 174. The side, middle and end guide rails are located in positions determined on the basis of the dimensions of the sheets to be aligned and assembled using the apparatus of this invention.

A plurality of holes 177 are formed in both sides of the sheet support surface to be aligned with the placement of at least some of the depressions formed on the opposite surface of the projections in the valleys of the sheets to be aligned by the apparatus 164. As illustrated in FIG. 17, two rows of laterally located holes 177 are formed in each of the sides 176 and 178 of the sheet support surface 174. The number and location of the holes is chosen based on the number needed to align the sheets accurately with respect to each other on each side of the sheet support surface. Extending through each of the holes 177 is an alignment pin 179 that is normally retracted when the sheets are first placed or slid onto the first and second sides of the sheet support surface 174.

Once the sheets are in approximate alignment between the side guide rails and the end guide rail, the alignment pins 179, attached to a vertically reciprocable table (not shown) below the sheet support surface 174, are extended upwardly to fit within the designated depressions of the bottom sheets to be aligned. The upward extension is preferably accomplished by actuating a switch that controls pneumatically operated lifters (not shown) beneath the pin support table. The lifters are supported by two lift support members 181 attached to the support structure for the apparatus 164 underneath the support surface and underneath the alignment pin table. Preferably, each lift support member 181 supports a pair of lifters so that each side 176 and 178 has a pair of lifters to raise the alignment pin table evenly when the pneumatic lifter controls are activated.

The apparatus 164 also includes an electricity supply and distribution unit 186, a wire within a protective conduit 188 leading to a switching control unit 190 that preferably requires two-hand operation to assure that a user's hands are both needed to turn on the apparatus so that the user's hands are out of the way when the apparatus is activated. Additionally, the apparatus comprises a pneumatic lifter 192, a suction sheet lifter head 193 connected to the pneumatic lifter 192 by support connection bars 194, a photocell position sensor 195, a pair of pneumatic lateral motion devices 196, and a suction supply manifold 198 that is connected to a number of suction tubes 200, each terminating in an opening at the underside of the suction sheet lifter head 193. An additional switch control unit 202 with appropriate electrical connections is also provided to control airflow supplying the pneumatic power and suction that is preferred for operating the apparatus.

Separate sources (not shown) of suction and compressed air may be provided or, preferably, a single source (not shown) of compressed air may be provided. Where a single source of compressed air is provided, the compressed air is routed through a conduit and any appropriate valves to a venturi unit (not shown) having a separate outlet that creates a suction. A suction supply conduit (not shown) connects the suction outlet from the venturi unit using appropriate remote control valves (not shown) to the suction supply manifold 198. If desired, the lifters for the alignment pin table (not shown), the lifter 192 for the suction sheet lifter head and the lateral motion devices 196 may operate other than pneumatically, such as hydraulically, or mechanically using racks and pinions, cams or other mechanical components with appropriate motors operatively connected using matched drive systems such as gears, chains and sprockets or belts and pulleys, or electromagnetically actuated devices such as solenoids. If any of these alternative driving means were to be used, the source of compressed air could be eliminated in favor of a single suction source. However, since considerable additional equipment would have to be used for any of the alternative driving means, resulting in additional expense for material and labor, a pneumatic driving means is preferred.

Once a sheet is aligned on each of the first and second sides 176, 178 of the support surface 174, the photocell position sensor 195 and suction are activated using the switch control unit 202. The operator then activates the pneumatic lift 192 and lateral motion devices 196 using the safety control unit 190. When all of these devices are activated, the suction sheet lifter head moves downward toward the sheet on the first or feed side 176 controlled by the pneumatic lifter 192. When the suction sheet lifter head 193 reaches the bottom of its travel, the suction sheet lifter head 193 then picks up the sheet by suction, and the pneumatic lifter 192 raises the suction sheet lifter head 193 and the sheet it has lifted by suction. The photocell sensor senses that the lifter head 193 is above a given level and sends an electrical signal to the control circuitry causing the appropriate pneumatic valves to open, in turn allowing the pneumatic lateral motion devices to shift the lifter head 193 and the sheet it has lifted to a position overlying the sheet on the second or fed side 178 of the support surface 174. The lifter head 193 is then lowered by the pneumatic lifter 192 to place the sheet it is carrying onto the sheet aligned on the second or fed side 178. Since both sheets were previously properly aligned, when the sheet is lifted and fed from the first side 176 to the section side 178, it remains in alignment for proper, aligned placement on top of the sheet in place on the second fed side 178. The suction through the suction sheet lifter head 193 is then interrupted so that the fed sheet remains in alignment on top of the sheet on the second side 178 of the sheet support surface 174. The lifter head 193 is then lifted upward by the pneumatic lifter 192, the photocell sensor senses that the lifter head has been lifted and sends a signal to activate the pneumatic control valves so that the lateral motion devices 196 shift the lifter head laterally back into its original position over the first, feed side 176, ready to begin the cycle again.

The aligned pair of sheets may then be moved in the direction of arrow G shown in FIG. 17 to the next station for securing the pair of sheets together by forming a plurality of positive locks by deforming a plurality of projection-depression couplings.

FIGS. 18 and 19 illustrate left-side and right-side isometric views, respectively, of the next station in the apparatus shown in FIG. 16, namely, a station 166 including a motorized crimping device 204 for crimping projection-depression couplings formed in a pair of aligned sheets. Preferably, but optionally, the pair of sheets has been aligned previously using the pick and place alignment apparatus 164 described above with respect to FIG. 17. If the optional pick and place alignment apparatus is not used, the station 166 becomes the first station in a motorized or automated operation for crimping together at least two sheets of deformable sheet material having a plurality of projection-depression couplings. The basic function and operation of crimping device 164 are similar to the function and operation of the crimping device 77 used in the apparatus illustrated and described above with respect to FIG. 11 that was adapted primarily for field operations.

The motorized crimping device 204 is mounted on support table 206. If the pick and place alignment apparatus 164 is used, the downstream end of the second or fed side 178 of that apparatus is aligned with the upstream end of the crimping device 204 that includes a support surface for the pair of sheets being fed into the device in a direction identified by arrow H in FIGS. 18 and 19. The crimping device 204 has a housing 208 seen intact in FIG. 16, but portions of the housing 208 have been removed in the views of FIGS. 18 and 19 for the sake of better clarity of illustration. Mounted for rotating motion in the housing 208 is a plurality of upper crimping gears 210 and opposed lower crimping gears 212. Four of such pairs of crimping gears are used if there are four rows of projection-depression couplings to be deformed across the width of the pair of sheets. More or fewer crimping gears can be added to crimp the desired number of projection-depression couplings formed across the width of any given pair of sheets. Since the structure, function and operation of the crimping gears that form positive locks by crimping the projection-depression couplings have been described above with respect to FIGS. 6, 7, 11 and 14, and the structure, function and operation of the crimping gears 210 and 212 are the same as those discussed above, that description need not be repeated here, but instead, is incorporated by reference.

Side edge guide rails 216 and 218, adjusted to the proper width of the sheets being assembled, are attached to the support surface 214 of the motorized crimping device 204. The station 166 also includes upper surface guide members 219, some portions of which are illustrated in FIGS. 18 and 19 as broken away for better clarity of illustration of other components of the crimping device 204. The upper surface guide members 219 are attached to the housing 208 and/or to the side edge guide rails 216 and 218 to retain the proper alignment of the pair of sheets entering and passing though the device 266 by limiting the upper movement of the sheets in the device.

A motor 220, such as an electric motor, a motor driven by an internal combustion engine or a hydraulic motor, is also mounted on the support table 206. The motor drives a first drive chain assembly 222 shown in FIG. 19. The first drive chain assembly 222 preferably comprises any appropriate gearing; a first, driving sprocket mounted on a first shaft 223 (a driveshaft) on which is also mounted the motor gears; a first, driving chain that is driven by the driving sprocket to drive a first driven sprocket mounted on a second shaft 224; a second, driving sprocket also mounted on the second shaft; and a chain driven by the second, driving sprocket to drive a second, driven sprocket that is mounted on a third shaft 226. The lower crimping gears are also mounted on the second shaft 224. Two alignment and feeding gears 213 are mounted on the third shaft 226. If desired more than two such gears could be mounted on the shaft 226. The alignment and feeding gears 213 have teeth that extend through slots 215 formed in the sheet support surface 214 and are aligned with the depressions formed on the opposite surface of the bottom sheet formed by the edge projections adjacent both side edges of the sheets being joined by the crimping device 204. The alignment and feeding gears are spaced to register with and extend into at least two of the depressions in a lateral row of the depressions formed in the bottom sheet passing through the crimping device 204, and are also located with respect to the crimping surfaces of the upper and lower crimping gears 210, 212 to synchronize the feeding of the sheets to assure proper crimping of the projection-depression couplings of the pair of sheets passing through the crimping device 204. Since the teeth of the alignment gears are registered with and extend into at least a portion of a lateral row of the depressions formed in the bottom sheet, and since the upper sheet of the pair of sheets passing through the crimping device 204 is aligned with the lower sheet, as the alignment and feeding gears rotate, they pull the aligned pair of sheets through the crimping device in proper alignment and registration for the crimping gears to form positive locks with the desired number, and preferably substantially all or all of the projection-depression couplings of the pair of sheets.

The motor 220 also drives a second drive chain assembly 228 located on the opposite side of the housing 208 with respect to the first drive chain assembly 222 and is shown in FIG. 18. The second drive chain assembly 228 is driven by a sprocket mounted on the second shaft 224 that is driven by the motor as described above. The second drive chain 228 preferably also includes a second sprocket or gear driven by the sprocket mounted on the second shaft 224. The second sprocket or gear drives a chain that in turn drives a third sprocket mounted on a shaft 230 on which is also mounted the upper crimping gears 210.

In view of the explanation of the operation of the first drive chain 222 and the second drive chain 228, it should be clear that the motor 220 drives not only the upper crimping gears 210 and the lower crimping gears 212, but also the alignment and feeding gears to feed the sheet pair through the crimping device 204 in proper alignment, registration and syncronization with the crimping surfaces of the crimping gears 210 and 212. Although the first and second drive chain assemblies have been described with respect to using sprocket and chain components, other suitable drive chain assembly components could be used instead, such as belt and pulley or shaft and gear drive chain components.

A control panel of switches 232 is electrically connected using appropriate circuitry to an electricity supply and distribution unit 234 and the motor 220 controls the operation of the motorized crimping device 204. In operation, a pair of sheets is inserted into the upstream end of the device until a lateral row of projection-depression couplings is aligned with the alignment and feeding gears. The motor is actuated by turning on a switch of the control panel 232. The motor drives the alignment and feeding gears to feed the pair of sheets in the direction of arrow H into the crimping device 204. The motor 220 also causes the upper and lower crimping gears to rotate. The rotating teeth of the crimping gears pull the pair of sheets through the crimping device as the crimping surfaces on the teeth of the crimping gears deform the projection-depression couplings passing between them to form positive locks. Preferably, all of the couplings throughout the length and width of the sheets are deformed by crimping to form the positive locks, although if desired, less than all of the couplings could be so deformed.

As the joined pair of sheets exits the crimping device 204 at the station 166, the pair of sheets is deposited onto a support table prior to being deposited at the next station comprising a motorized and automated edge crimping device 168 that is used to attach pairs of preassembled sheets together to form a contact body or any other structure having any desired number of assembled sheets.

The motorized and automated side edge crimping device 168 has the same function and purpose as the manually operated edge crimping devices shown and described with respect to FIGS. 8, 9, 13 and 15, but preferably (although not exclusively) uses a plurality of the edge crimping tools 52 shown and described with respect to FIGS. 8 and 9 as part of a different crimping device or apparatus than the crimping devices of FIGS. 12, 13 and 15. Thus, the basic function and purpose of the previously described side edge crimping device 79 and those of the motorized side edge crimping device 168 are the same, namely, to deform by crimping between the edge crimping tools a sufficient number, preferably a majority and more preferably substantially all or all of the projection-depression couplings adjacent the edges of more than a pair of sheets to form positive locks preferably all along both side edges of the sheets and build an assembly of sheets. However, the motorized side edge crimping device 168 is considerably more sophisticated and performs the function for the same purpose in a different way.

Figure 20:
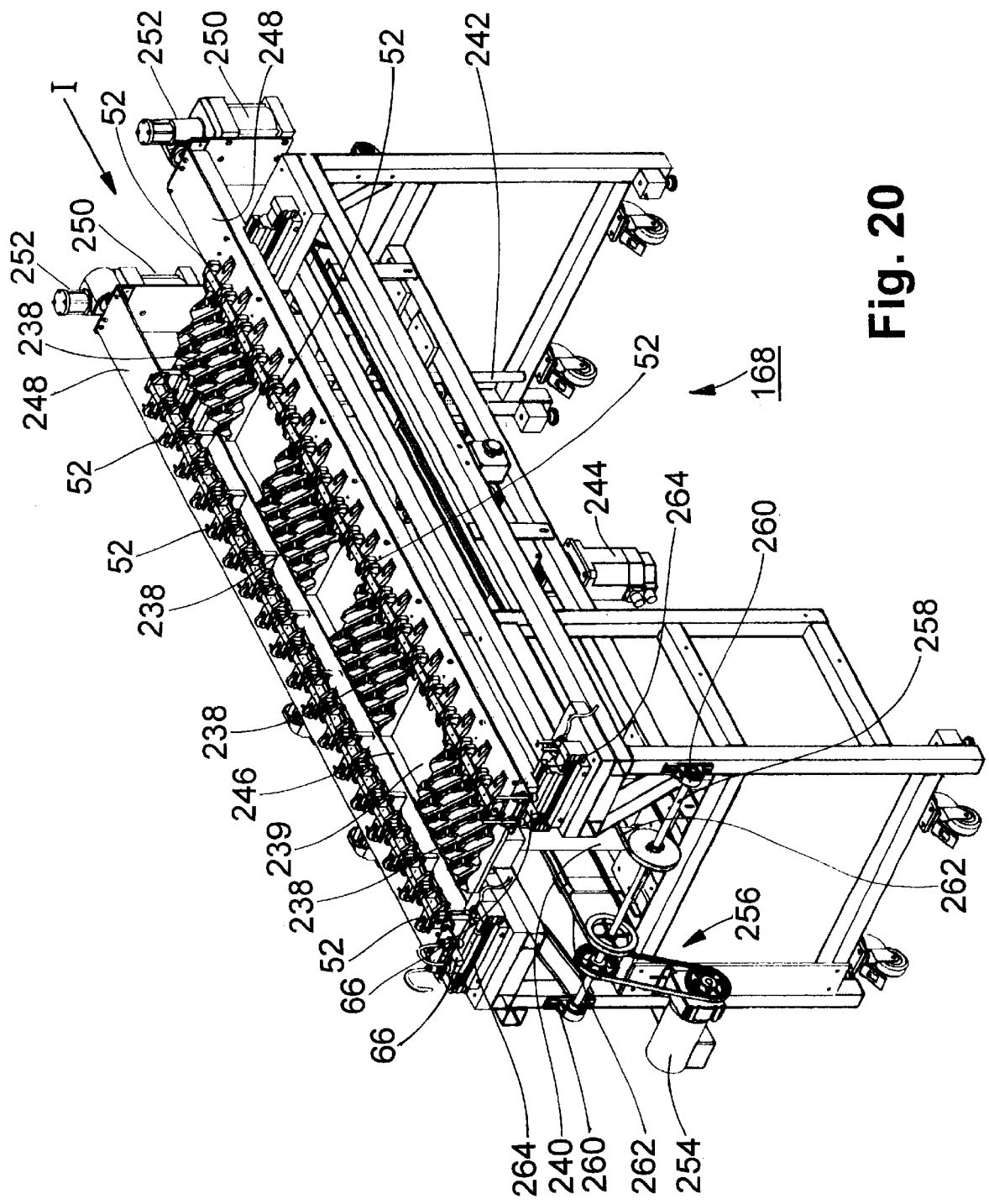
FIG. 20 is an isometric view from the right front corner of another edge crimping device in accordance with a particular preferred embodiment of the present invention, having portions of its housing removed for ease of illustration, useful in the apparatus of FIG. 16.

The motorized crimping device 168 as shown in FIG. 20 has portions of its housings, shown fully assembled in FIG.

16, removed for the sake of better clarity of illustration. The device 168 includes an appropriate support structure generally designated by reference numeral 236, having a framework, legs, bracing, etc., sufficient to support the device. A number of location and alignment members 238 are attached to a vertically adjustable sheet and contact body support table 239. The location and alignment members 238 have an upper surface molded to conform to the lower surface of the bottom or first sheet of an assembly of at least three sheets, and typically more than two pairs of sheets to be processed in the device 168. A sufficient number, such as four for example, of members 238 are attached to and spaced along the length of the support table 239 to properly locate and align the sheets on the support table 239. The number can be determined empirically with respect to the dimensions of any given assembly of sheets being joined together. Side edge guide rails 246 also help with alignment of the sheets being joined together.

The device 168 also includes a sufficient number of support table telescoping supports 240 connected to the table framework and to the support table 239, and threaded height adjustment rods 242 for adjusting the height and vertical travel of the support table 239. The top of the rods 242 are connected by rotatable slip joints to the bottom of the support table. A motor 244 controls the height and vertical travel of the support table 239 by driving, through a suitable linkage forming part of a drive chain assembly, appropriate gears, such as threaded worm gears, that turn the height adjustment rods within a housing fixed relative to the framework of the support table, so that as the rods 242 rotate in one direction, the support table 239 is raised and as the rods 242 rotate in the opposite direction, the support table 239 is lowered.

A number of edge crimping tools, preferably of the type shown and described as crimping tools or devices 52 with respect to FIGS. 8 and 9, are mounted to and in lateral alignment along edge crimping tool support assemblies 249 located along each side of the device 168. With reference to FIGS. 8 and 9, as well as to FIG. 20, the edge crimping device 168 includes a common cam shaft 66 on which are mounted a plurality of the eccentric cams 68, each of which controls the opening and the closing of the jaws of one of the crimping tools aligned along each of the support assemblies 248. The ends of each of the common camshafts 66 are also shown at the left-hand side of FIG. 20 (corresponding to the front of the device 168). The opposite end of each common camshaft 66 is operatively connected to a rack and pinion assembly 250 attached to the framework of the device 168. A pneumatic driver 252 drives the rack and pinion assembly. Actuation of the pneumatic driver 252 causes relative movement of the rack and pinion assembly, resulting in the arcuate movement of the cam shaft 66 and the plurality of mounted eccentric cams that control the opening and closing of the jaws of the crimping tools 52. The compressed air to operate the pneumatic drivers can come from the same source as the source of the compressed air described above with respect to the pick and place alignment device 164. As before, other types of actuators, besides pneumatic drivers, may be used to drive the rack and pinion assembly to open and close the jaws of the edge crimping tools 52. Non-limiting examples include hydraulic actuators, or electromagnetically actuated devices such as solenoids.

To effect crimping of the projection-depression couplings along the side edges of two pairs of pre-joined sheets, or to effect similar edge crimping involving a pair of pre-joined sheets and one or more additional sheets, the edge crimping tool support assemblies 248 are moved laterally toward each other and the centerline of the apparatus 168, after the pairs of sheets or at least one single sheet and a pair or many pairs of sheets have been aligned. Lateral motion devices 264, such as pneumatic actuators, move each of the support assemblies 248 laterally until the jaws of the side edge crimping tools are positioned over the aligned projection-depression couplings they are intended to deform to form positive locks. Four such lateral motion devices 264, two for each of the tool support assemblies 248, one at the front and one at the back of the apparatus 168, are illustrated in FIG. 20, although more or fewer could be used if desired. Non-limiting examples of other types of actuators besides or in addition to pneumatic actuators for the lateral motion devices, include hydraulic actuators, or electromagnetically actuated devices such as solenoids.

When one pair of sheets is joined along its side edges to another pair or to an additional single sheet, the assembly so made is supported by the support table 239. If successive pairs or single sheets are to be added to the assembly previously processed at the station 164, each successive pair of pre-joined sheets or each additional single sheet is placed on top of the previously assembled sheets or contact body. The entire stack is lowered by lowering the support table 239 a distance equal to the vertical distance between the previously formed positive locks and the next vertical level of positive locks to be formed corresponding to the new top layer of single or pre-joined pairs of sheets. The process is repeated until a contact body or other assembly of the desired number of sheets is completed. Once a stack of several sheets or pairs of sheets has been joined along the side edges, the support table 239 is relative low, and the assembled sheets need to be removed from the station 168 and the cycle repeated for other assemblies of sheets.

A motor 254 is attached to the framework of the support structure 236 for the motorized crimping device 164. This motor, like motor 244, is preferably an electric motor, although other types of motors can be used for either motor 244 or motor 254, including by way of non-limiting example, internal combustion motors and hydraulic or pneumatic motors. The motor 254 through a drive chain assembly 256, preferably in the form of a belt and pulleys, drives a shaft 258 that rotates within bearings 260 attached to the support structure 236 for the device 168. Also mounted on the shaft 258 are a pair of pulleys driving conveyor belts 262 that loop around similar pulleys mounted on a freely rotating shaft mounted in bearings attached to the support structure at the other end of the device 168. The motor 254 is activated at a time when the support table 239 is lowered to a position below the level of the top run of the conveyor belts 262, such that the bottom sheet, and therefore all sheets stacked thereon comprising the assembled sheets, are supported by the top run of the conveyor belts 262. The motor 254 causes the top run of the belts 262 to convey the stack of assembled sheets in the form of a contact body or other structure in a direction of the arrow I in FIG. 20 away from the motorized edge crimping station 168 so that another stack of pairs or single sheets may be joined along their side edges at the motorized edge crimping device 168.

The apparatus 168 includes an appropriate electricity supply and distribution unit, including control panels with the necessary switches with appropriate circuitry that could be made readily by a skilled electrician. Sources of compressed air to run the pneumatically controlled actuators and motors are readily available or could be generated in situ using a compressor or the like.

To operate the apparatus 168, two pairs of pre-joined sheets or a pair and one or more single sheets are fed into or placed into the apparatus 168, such that the bottom sheet is aligned over the location and alignment members 238. When the sheets are aligned, the lateral motion drivers 264 are actuated, causing the support assemblies 248 that carry the edge crimping tools 52 to move the tools into crimping position. When the crimping tool jaws are aligned above and below the projection-depression couplings along the side edges to be deformed by crimping, the pneumatic drivers 252 for the rack and pinion assemblies 250 cause the proper degree of rotation of the cam shafts 66, thereby simultaneously causing the jaws of the crimping tools 52 to close and form the positive locks by deforming the edge projection-depression couplings aligned with the jaws. The jaws of the crimping tools are then opened by causing the pneumatic drivers 252 to move the rack and pinion assembly to the jaws' open position.

Successive pairs of sheets or single sheets to be edge crimped are added to the top of the stack of the pre-assembled sheets. The height adjustment motor 244 is activated to rotate the threaded height adjustment rods 242 sufficiently to lower the support table 239 by an amount that allows the edge crimping tools to align with the next higher level of sheets to be processed as described above. The cycle is repeated until the desired number of sheets or pairs of sheets have been added to and positively locked to the sheet assembly.

When the desired number of sheets are formed into the contact body or other sheet assembly, the motor 244 is again actuated to lower the surface of the support table 239 below the level of the top run of the conveyor belt 262, such that the contact body or other sheet assembly is supported by the top run of the conveyer belt 262. The motor 254 is then actuated to convey the contact body or other sheet assembly away from the apparatus. Once the contact body or other sheet assembly has been removed, motor 244 is reversed to raise the support table 239 to the starting height.

If desired, the entire operation represented by any or preferably all of the component stations or apparatus 164, 166 and 168 could be automated and controlled by an appropriately programmed general-purpose digital computer. There are a limited number of steps that need be programmed, and a computer programmer of ordinary skill in the art could develop an appropriate computer program based on the detailed disclosure set forth herein without undue experimentation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for crimping together interlocked portions of at least two sheets of deformable corrugated sheet material, the corrugations having crests and valleys, the crests having peaks and the valleys having troughs, the sheet material being defined by opposed side edges and having opposing surfaces, the sheet material having a plurality of projections extending outward from one surface of each sheet and located on the peak surfaces of the crests and the trough surfaces of the valleys, wherein each projection defines a depression on the opposite surface of the sheet, the projections of one sheet being disposed within mating depressions of an adjacent sheet to form projection-depression couplings, and the projection-depression couplings being deformable to form positive locks by being crimped into a form of flattened interlocking rivets, the apparatus comprising a support surface for the sheets, a first crimping surface disposed adjacent one surface of the sheets and a second crimping surface disposed adjacent the opposite surface of the sheets and alignable with the first crimping surface, the first and second crimping surfaces having an open position for insertion of at least some of the projection-depression couplings formed by aligning the sheets such that the projection of one sheet is coupled with the depression of another sheet, the first and second crimping surfaces having a crimping position that deforms the projection-depression couplings to form a positive lock, each of the first crimping surfaces being formed on a portion of a tool having at least one of rotatable gear teeth and a jaw member relatively movable with respect to the second crimping surfaces, the second crimping surfaces being formed respectively on at least one of rotatable gear teeth and an anvil member, the apparatus further comprising at least two tools for crimping at least two projection-depression couplings as the sheets travel past the tools, at least some of the tools are at least two laterally disposed gears having a plurality of teeth bearing the first crimping surfaces and disposed adjacent one surface of the sheets for crimping projection-depression couplings located on the interior of the sheets away from the side edges of the sheets and at least two laterally disposed gears having a plurality of teeth bearing the second crimping surfaces and disposed adjacent the opposite surface of the sheets aligned with the gear teeth bearing the first crimping surfaces for crimping projection-depression couplings located adjacent the side edges of the sheets, the apparatus further comprising another set of tools for crimping only the edge projection-depression couplings, wherein the another set of tools comprises one of (a) opposed pairs of gears aligned on opposite side edges of the sheets having teeth with beveled first and second crimping surfaces that are disposed to crimp projection-depression couplings adjacent each of the side edges of the sheets and (b) opposed pairs of jaw members and anvil members on which are formed first and second crimping surfaces, the opposed pairs being aligned adjacent the side edges of the sheets.

2. The apparatus according to claim 1, wherein the another set of tools are at least two laterally disposed opposed pairs of gears, each pair of opposed gears being located adjacent an opposite side edge of the sheets and having a plurality of teeth bearing beveled first crimping surfaces and disposed adjacent one surface of the sheets and at least two laterally disposed gears having a plurality of teeth bearing beveled second crimping surfaces and disposed adjacent the opposite surface of the sheets aligned with the gear teeth bearing the first crimping surfaces.

3. The apparatus according to claim 1, comprising two stations, a first station having pairs of gears disposed to crimp projection-depression couplings located in the interior of the sheets away from the side edges of the sheets and pairs of gears disposed to crimp projection-depression couplings adjacent each of the side edges of the sheets, and a second station having pairs of gears with mating opposed beveled crimping surfaces disposed to crimp projection-depression couplings adjacent each of the side edges of the sheets.

4. The apparatus according to claim 3, further comprising a preliminary station before the first station comprising a fixture to align the sheets and tools to crimp at least two projection-depression couplings to form a positive lock and retain the sheets in alignment as the sheets approach the first station.

5. The apparatus according to claim 3, wherein the tools are powered manually.

6. The apparatus according to claim 3, wherein the tools are powered by motors.

7. The apparatus according to claim 1 comprising two stations, a first station having gears disposed to crimp projection-depression couplings located in the interior of the sheets away from the side edges of the sheets and gears disposed to crimp projection-depression couplings adjacent each of the side edges of the sheets, and a second station having at least two sets of tools comprising jaw members bearing the first crimping surfaces and disposed adjacent one surface of the sheets, and anvil members bearing the second crimping surfaces aligned with the jaw members and disposed adjacent the opposite surface of the sheets, the jaw members and anvil members being movable with respect to each other from the open position to the crimping position, each set being disposed adjacent opposite side edges of the sheets.

8. The apparatus according to claim 7, wherein the movement of the jaw members and the anvil members with respect to each other is cam-actuated.

9. The apparatus according to claim 8, wherein the cam-actuated relative movement is manually powered.

10. The apparatus according to claim 8, wherein the cam-actuated relative movement is powered by motive power.

11. The apparatus according to claim 7, further comprising a preliminary station before the first station comprising an apparatus to align the sheets.

12. The apparatus according to claim 11, wherein the preliminary station comprises pick and place equipment by which a first sheet is lifted and thereafter shifted onto, and in appropriate alignment with, a second sheet to form a plurality of projection-depression couplings.

13. The apparatus according to claim 12, wherein each of the stations has an automated operation.

14. The apparatus according to claim 11, wherein each of the stations has an automated operation.

* * * * *

UNITED STATES PATENT AND TRADEMARK OFFICE
CERTIFICATE OF CORRECTION

PATENT NO.    : 6,640,427 B2
DATED         : November 4, 2003
INVENTOR(S)   : Timothy E. Krell, Al Bino and Andrew L. Truex It is certified that error appears in the above-identified patent and that said Letters Patent is hereby corrected as shown below:

Title page,
Item [12], United States Patent, "Aull et al." should read -- Krell et al. --
Item [75], Inventors, "Richard J. Aull, Reading, PA (US); Al Bino, Sinking Spring, PA (US); Timothy E. Krell, Fleetwood, PA (US); Palle Rye, Shillington, PA (US); Andrew L. Truex, Shillington, PA (US)" should read
-- Timothy E. Krell, Fleetwood, PA (US); Al Bino, Sinking Spring, PA (US); Andrew L. Truex, Shillington, PA (US) --.

Signed and Sealed this

Ninth Day of August, 2005

JON W. DUDAS
*Director of the United States Patent and Trademark Office*